United States Patent
Ge et al.

(10) Patent No.: US 12,375,736 B2
(45) Date of Patent: Jul. 29, 2025

(54) HIERARCHICAL AUDIO/VIDEO OR PICTURE COMPRESSION METHOD AND APPARATUS

(71) Applicant: HUAWEI TECHNOLOGIES CO., LTD., Guangdong (CN)

(72) Inventors: Yunying Ge, Beijing (CN); Jing Wang, Beijing (CN); Yibo Shi, Beijing (CN); Shangyin Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 162 days.

(21) Appl. No.: 18/453,933

(22) Filed: Aug. 22, 2023

(65) Prior Publication Data

US 2023/0396810 A1    Dec. 7, 2023

Related U.S. Application Data

(63) Continuation of application No. PCT/CN2022/077341, filed on Feb. 23, 2022.

(30) Foreign Application Priority Data

Feb. 25, 2021 (CN) .......................... 202110212042.1

(51) Int. Cl.
*H04N 19/91* (2014.01)
*G06V 10/771* (2022.01)
(Continued)

(52) U.S. Cl.
CPC ........... *H04N 19/91* (2014.11); *G06V 10/771* (2022.01); *H04N 19/184* (2014.11)

(58) Field of Classification Search
CPC ....... H04N 19/91; G06V 10/771; G06V 10/84
(Continued)

(56) References Cited

U.S. PATENT DOCUMENTS

2020/0027247 A1   1/2020  Minnen et al.
2020/0304835 A1*  9/2020  Liu .......................... H04N 19/91

FOREIGN PATENT DOCUMENTS

CN    112702592 A    4/2021
JP    2018061091 A   4/2018

OTHER PUBLICATIONS

Yueyu Hu et al: "Coarse-to-Fine Hyper-Prior Modeling for Learned Image Compression" Jun. 2, 2020, total 8 pages.
(Continued)

*Primary Examiner* — Jeffery A Williams
(74) *Attorney, Agent, or Firm* — WOMBLE BOND DICKINSON (US) LLP

(57) ABSTRACT

This application provides an audio/video or picture compression method and apparatus, which relates to the field of artificial intelligence (AI)-based audio/video or picture compression technologies, and to the field of neural network-based audio/video or picture compression technologies. The method includes: transforming a raw audio/video or picture to feature space through a multilayer convolution operation, extracting features of different layers in the feature space, outputting rounded feature signals of the different layers, predicting probability distribution of shallow feature signals by using deep feature signals or entropy estimation results, and performing entropy encoding on the rounded feature signals. In this application, signal correlation between different layers is utilized. In this way, audio/video or picture compression performance can be improved.

19 Claims, 31 Drawing Sheets

(51) Int. Cl.
     *G06V 10/84*       (2022.01)
     *H04N 19/184*      (2014.01)
(58) Field of Classification Search
     USPC .................................................. 375/240.02
     See application file for complete search history.

(56) References Cited

OTHER PUBLICATIONS

Johannes Ballé et al: "Variational Image Compression with a Scale Hyperprior" arXiv:1802.01436v2 [eess.IV] May 1, 2018, total 23 pages.
Jooyoung Lee et al: "Context-adaptive Entropy Model For End-to end Optimized Image Compression" arXiv:1809.10452v4 [eess.IV] May 6, 2019, total 20 pages.
Leonhard Helminger et al: "Lossy Image Compression with Normalizing Flows" arXiv:2008.10486v1 [cs. CV] Aug. 24, 2020, total 12 pages.
Ken Nakanishi et al: "Neural Multi-scale Image Compression" arXiv:1805.06386v1 [stat. ML] May 16, 2018, total 15 pages.

\* cited by examiner

HIERARCHICAL AUDIO/VIDEO OR PICTURE COMPRESSION METHOD AND APPARATUS

CROSS-REFERENCE TO RELATED APPLICATIONS

This application is a continuation of International Application No. PCT/CN2022/077341, filed on Feb. 23, 2022, which claims priority to Chinese Patent Application No. 202110212042.1, filed on Feb. 25, 2021. The disclosures of the aforementioned applications are hereby incorporated by reference in their entireties.

TECHNICAL FIELD

Embodiments of the present disclosure relate to the field of artificial intelligence (AI)-based audio/video or picture compression technologies, and in particular, to a hierarchical audio/video or picture compression method and apparatus.

BACKGROUND

Audio/video or picture coding (video encoding and decoding) is widely used in digital audio/video or picture applications, such as digital video broadcasting, audio/video or picture transmission on the Internet and mobile networks, real-time session applications such as audio/video chats and audio/video conferences, DVDs (digital video discs) and Blu-ray discs, audio/video or picture content capture and editing systems, and security applications of portable cameras.

A large amount of audio/video data needs to be described even when a video is short. This may result in difficulty when data needs to be transmitted on a network with a limited bandwidth capacity and transmitted in another manner. Therefore, audio/video or picture data usually needs to be compressed before being transmitted on a modern telecommunication network. Memory resources may be limited. Therefore, when audios/videos are stored on a storage device, sizes of audios/videos or pictures may also become an issue. An audio/video or picture compression device usually uses software and/or hardware on a source side to encode video data before transmission or storage. This reduces an amount of data required for representing digital audios/videos or pictures. Then compressed data is received by a video decompression device on a destination side. Due to limited network resources and an increasing requirement for higher video quality, compression and decompression technologies need to be improved. In improved technologies, a compression ratio can be increased with little impact on audio and picture quality.

In recent years, application of deep learning in the audio/video or picture coding field gradually becomes a trend. For example, Google has organized CLIC (Challenge on Learned Image Compression) theme competitions at CVPR (Computer Vision and Pattern Recognition) conferences for consecutive years. CLIC focuses on using a deep neural network to improve picture compression efficiency. In 2020, a video or picture challenge category was further added to CLIC. Based on performance evaluation of a competition scheme, comprehensive compression efficiency of a current deep learning technology-based picture coding scheme is equivalent to that of a latest-generation video and picture coding standard: VVC (Versatile Video Coding). In addition, the solution has unique advantages in improving user-perceived quality.

Formulation of a video standard of VVC was completed in June 2020. The standard covers almost all technical algorithms that can significantly improve compression efficiency. Therefore, it is difficult to make great technical breakthroughs in researches of new compression coding algorithms based on conventional signal processing means. Different from a conventional picture algorithm in which modules of picture compression are optimized through manual designs, end-to-end AI-based picture compression is optimized as a whole. Therefore, an AI-based picture compression scheme has better compression effect. A variational autoencoder (Variational Autoencoder, AE) method is a mainstream technical solution of a current AI-based lossy picture compression technology. In the current mainstream technical solution, there is an AE limit problem that model compression quality tends to be stable at a high bit rate of a fixed model. Although the AE limit problem can be alleviated by increasing computing power, a problem of high computing power occurs.

SUMMARY

This application provides a hierarchical audio/video or picture compression method and apparatus, to break through an AE limit at a high bit rate and reduce computing power and run-time of a model while ensuring compression quality at a low bit rate.

According to a first embodiment, an audio/video or picture encoding method is provided, including: enabling a to-be-encoded audio or picture to pass through an encoding network to obtain a first output feature map of the to-be-encoded audio or picture and a second output feature map of the to-be-encoded audio or picture; rounding the first output feature map to obtain a first rounded feature map of the to-be-encoded audio or picture; rounding the second output feature map to obtain a second rounded feature map of the to-be-encoded audio or picture; performing entropy encoding on the second rounded feature map based on a probability estimation result of second entropy estimation to obtain a second encoded bitstream; performing probability estimation of first entropy estimation based on the second rounded feature map and/or the probability estimation result of the second entropy estimation; and performing entropy encoding on the first rounded feature map based on the probability estimation result of the first entropy estimation to obtain a first encoded bitstream.

In the foregoing technical solution, probability estimation of the first entropy estimation is performed based on the second rounded feature map and/or the probability estimation result of the second entropy estimation, so that signal correlation between different networks is utilized. In this way, audio or picture compression performance can be improved.

In the foregoing technical solution, according to the Nyquist sampling theorem, a high-frequency signal requires a smaller receptive field, and a low-frequency signal requires a larger receptive field. A first encoding network corresponding to a shallow network in the encoding network has a small receptive field. This facilitates capturing of high-frequency information. A to-be-encoded signal corresponding to a deep network in the encoding network passes through the first encoding network and a second encoding network, and has a large receptive field. This facilitates capturing of a low-frequency signal. High-frequency information and low-frequency information are transmitted in a hierarchical manner, and calculation of the high-frequency information is performed only on the shallow network. This can reduce computing power.

In the foregoing technical solution, the rounding operation may include a rounding-down operation, a rounding-off operation, or a rounding-up operation.

In the foregoing technical solution, entropy estimation is performed to estimate a probability of each point in a rounded feature map, so as to estimate a compression bit rate of a model.

In the foregoing technical solution, an entropy encoding scheme includes but is not limited to a variable-length encoding scheme and an arithmetic encoding scheme. The variable-length encoding scheme may include exponential Golomb encoding (Exponential Golomb Codes) and context-adaptive variable-length encoding (CAVLC). The arithmetic encoding scheme may include context-adaptive binary arithmetic encoding (CABAC).

In some embodiments, the method further includes: enabling the to-be-encoded audio or picture to pass through the encoding network to obtain a third output feature map of the to-be-encoded audio or picture, and rounding the third output feature map to obtain a third rounded feature map of the to-be-encoded audio or picture; and performing entropy encoding on the third rounded feature map based on a probability estimation result of third entropy estimation to obtain a third encoded bitstream.

In some embodiments, the third entropy estimation result and/or the third rounded feature map of the to-be-encoded audio or picture are input information of the second entropy estimation.

In some embodiments, the method further includes: enabling the to-be-encoded audio or picture to pass through the encoding network to obtain a $k^{th}$ output feature map of the to-be-encoded audio or picture, and rounding the $k^{th}$ output feature map to obtain a $k^{th}$ rounded feature map of the to-be-encoded audio or picture, where k is an integer greater than 3.

In the foregoing technical solution, the $k^{th}$ rounded feature map and/or a $k^{th}$ entropy estimation result are input information of $n^{th}$ entropy estimation, where n is an integer less than or equal to k.

In some embodiments, the method further includes: using at least one of the rounded feature maps as input of a decoding network of the to-be-encoded audio or picture, and enabling the at least one of the rounded feature maps to pass through the decoding network to obtain a reconstructed audio or picture of the to-be-encoded audio or picture; calculating a difference between corresponding samples of the to-be-encoded audio or picture and the reconstructed audio or picture to obtain a residual picture of the to-be-encoded audio or picture; and obtaining probability estimation of lossless entropy estimation of a to-be-decoded audio or picture based on at least one of the following three types of information:

(1) any one or more of the entropy estimation results;
(2) any one or more of the rounded feature maps; or
(3) the reconstructed audio or picture; and
performing entropy encoding on the residual picture based on the lossless entropy estimation result to obtain a lossless encoded bitstream of the to-be-encoded audio or picture.

In some embodiments, any one of the encoding networks is one or more convolutional networks.

In some embodiments, a probability estimation result of $r^{th}$ entropy estimation is output as mean and variance information of an $r^{th}$ rounded feature map.

In some embodiments, the method further includes: before the rounding the first output feature map to obtain a first rounded feature map of the to-be-encoded audio or picture, the method further includes: subtracting a pixel value of a sample in the first output feature map and a mean output by the first entropy estimation to obtain a first offset feature map; and the rounding the first output feature map to obtain a first rounded feature map of the to-be-encoded audio or picture includes: rounding the first offset feature map to obtain the first rounded feature map of the to-be-encoded audio or picture.

It should be understood that the foregoing possible embodiment may alternatively be used for obtaining any rounded feature map.

It should be understood that the foregoing picture compression method may be used in a training stage of a neural network, or may be used in an inference stage of a neural network. This is not limited in this application.

It should be understood that the to-be-encoded audio or picture is transformed to feature space through an operation on the encoding network, and features of different layers, such as layers 1, 2, . . . , and n or several layers thereof, in the feature space are extracted from a plurality of output feature maps corresponding to a plurality of encoding networks for compression. Characteristic frequencies of the layers 1, 2, . . . , and n sequentially decrease. In addition, a quantity of feature layers used for compression is variable, and a quantity of feature channels at each layer is variable, to achieve a dynamic compression adjustment capability.

According to a second embodiment, an audio or picture decoding method is provided, including: obtaining a first to-be-decoded bitstream of a to-be-decoded audio or picture; obtaining a second to-be-decoded bitstream of the to-be-decoded audio or picture; performing entropy decoding on the second decoded bitstream of the decoded picture based on a probability estimation result of second entropy estimation of the to-be-decoded audio or picture to obtain a second decoded feature map of the to-be-decoded audio or picture; performing probability estimation of first entropy estimation based on the second feature map and/or the probability estimation result of the second entropy estimation to obtain a probability estimation result of the first entropy estimation; performing entropy decoding on the first decoded bitstream based on the probability estimation result of the first entropy estimation to obtain a first decoded feature map of the to-be-decoded audio or picture; and outputting a reconstructed audio or picture of the to-be-decoded audio or picture by using the first decoded feature map and/or the second decoded feature map as input of a decoding network.

In the foregoing technical solution, probability estimation of the first entropy estimation is performed based on the second decoded feature map and/or the probability estimation result of the second entropy estimation, so that signal correlation between different layers in feature space is utilized. In this way, picture compression performance can be improved.

In the foregoing technical solution, entropy estimation is performed during decoding to estimate a probability of each point in a decoded feature map, so as to estimate a compression bit rate of a model.

In the foregoing technical solution, an entropy decoding scheme includes but is not limited to a variable-length decoding scheme and an arithmetic decoding scheme. The variable-length decoding scheme may include exponential Golomb decoding (Exponential Golomb Codes) and context-adaptive variable-length decoding (CAVLC). The arithmetic decoding scheme may include context-adaptive binary arithmetic decoding (CABAC).

In some embodiments, the method further includes: obtaining a third to-be-decoded bitstream of the to-be-decoded audio or picture; performing entropy decoding on the third to-be-decoded bitstream based on a probability estimation result of third entropy estimation of the to-be-decoded audio or picture to obtain a third decoded feature map of the to-be-decoded audio or picture; and performing probability estimation of the second entropy estimation of the to-be-decoded audio or picture based on the third decoded feature map and/or the probability estimation result of the third entropy estimation. The outputting a reconstructed audio or picture of the to-be-decoded audio or picture includes: The decoding network outputs the reconstructed audio or picture of the to-be-decoded audio or picture by using at least one of the first decoded feature map, the second decoded feature map, and the third decoded feature map as input of the decoding network.

In some embodiments, probability estimation of the second entropy estimation is performed on the to-be-decoded audio or picture based on the third decoded feature map and/or the probability estimation result of the third entropy estimation.

In some embodiments, the method further includes: obtaining an $m^{th}$ to-be-decoded bitstream of the to-be-decoded audio or picture; and performing entropy decoding on the $m^{th}$ to-be-decoded bitstream based on a probability estimation result of $m^{th}$ entropy estimation of the to-be-decoded audio or picture to obtain an $m^{th}$ decoded feature map of the to-be-decoded audio or picture, where m is an integer greater than 3.

In the foregoing possible embodiment, the $m^{th}$ decoded feature map is input information of $t^{th}$ entropy estimation, where t is an integer less than or equal to m.

In some embodiments, the method further includes: obtaining a to-be-losslessly-decoded bitstream of the to-be-decoded audio or picture, and obtaining a probability estimation result of lossless entropy estimation of a to-be-decoded audio or picture based on at least one of the following three types of information:
(1) at least one of the decoded feature maps;
(2) at least one of the probability estimation results of the entropy estimation; or
(3) the reconstructed audio or picture of the to-be-decoded audio or picture; and
performing entropy decoding on the to-be-losslessly-decoded bitstream based on the probability estimation result of the lossless entropy estimation of the to-be-decoded audio or picture to obtain a residual picture of the to-be-decoded audio or picture, and performing summation on corresponding samples of the reconstructed audio or picture of the to-be-decoded audio or picture and the residual picture of the to-be-decoded audio or picture to obtain a lossless reconstructed audio or picture of the to-be-decoded audio or picture.

In some embodiments, the method further includes: when the first decoded feature map is input of the decoding network, adding up a pixel value of a sample in the first decoded feature map and a mean output by the first entropy estimation to obtain the first decoded feature map.

It should be understood that the foregoing possible embodiment may alternatively be used for obtaining any decoded feature map.

It should be understood that the foregoing picture compression method may be used in a training stage of a neural network, or may be used in an inference stage of a neural network. This is not limited in this application.

A hierarchical decoding scheme is used. Therefore, feature information of different frequency components is extracted from different layers, so that entropy decoding at the different layers is performed in a more targeted and effective manner. This helps improve signal compression and encoding performance. In addition, correlation between inter-layer feature signals is utilized. This also facilitates implementation of entropy estimation. Based on these two factors, compression quality can be ensured at a low bit rate, that is, when reconstruction and output are performed by using only a few hierarchical decoded features. Similarly, based on these two factors, compression quality can be further improved to break through an AE limit at a high bit rate, that is, when reconstruction and output are performed by using more hierarchical decoded features. A hierarchical structure is used, so that the hierarchical decoding scheme can be used according to an actual requirement. When shallow output of the decoding network is used, a quantity of network layers in the decoding network that are required for obtaining decoded features is smaller, so that computing power and run-time of the model are reduced.

According to a third embodiment, an audio or picture compression processing apparatus is provided, including:
an encoding network module, configured to: transform a to-be-encoded audio or picture to feature space through an operation on an encoding network, and extract features of different layers, such as layers 1, 2, ..., and n or several layers thereof, in the feature space from a plurality of output feature maps corresponding to a plurality of encoding networks for compression, where characteristic frequencies of the layers 1, 2, ..., and n sequentially decrease, a quantity of feature layers used for compression is variable, and a quantity of feature channels at each layer is variable, to achieve a dynamic compression adjustment capability;
a rounding module, configured to round each point in the output feature maps to an integer for subsequent encoding;
an entropy estimation network module, configured to estimate a probability of each point in a rounded feature map, so as to estimate a compression bit rate of a model; and
an entropy encoding/decoding module, configured to perform entropy encoding on a plurality of rounded feature maps based on probability distribution obtained by an entropy estimation model, to obtain a plurality of encoded bitstreams, where this reduces encoding redundancy of output features, and further reduces an amount of data transmitted during picture compression; and decode the encoded bitstreams to obtain decoded feature maps; and
a decoding network module, configured to perform inverse transformation on the decoded feature maps to parse the decoded feature maps into an audio or picture.

For further functions implemented by the encoding network module, the rounding module, the entropy estimation network module, the entropy encoding/decoding module, and the decoding network module, refer to any one of the first embodiment, the second embodiment, or the embodiments of the first embodiment or the second embodiment. Details are not described herein again.

According to a fourth embodiment, this application provides an encoder, including a processing circuit, configured to perform the method according to any one of the first embodiment or the embodiments of the first embodiment.

According to a fifth embodiment, this application provides a decoder, including a processing circuit, configured to perform the method according to any one of the second embodiment or the embodiments of the second embodiment.

According to a sixth embodiment, this application provides a computer program product, including program code. When being executed on a computer or a processor, the program code is used for performing the method according to any one of the first embodiment or the embodiments of the first embodiment, or any one of the second embodiment or the embodiments of the second embodiment.

According to a seventh embodiment, this application provides an encoder, including: one or more processors; and a non-transitory computer-readable storage medium, coupled to the processor and storing a program to be executed by the processor, where when the program is executed by the processor, the decoder is enabled to perform the method according to any one of the first embodiment or the embodiments of the first embodiment.

According to an eighth embodiment, this application provides a decoder, including: one or more processors; and a non-transitory computer-readable storage medium, coupled to the processor and storing a program to be executed by the processor, where when the program is executed by the processor, the encoder is enabled to perform the method according to any one of the second embodiment or the embodiments of the second embodiment.

According to a ninth embodiment, this application provides a non-transitory computer-readable storage medium, including program code. When being executed by a computer device, the program code is used for performing the method according to any one of the first embodiment or the embodiments of the first embodiment, or any one of the second embodiment or the embodiments of the second embodiment.

According to a tenth embodiment, the present disclosure relates to an encoding apparatus that has a function of implementing the behavior in the method embodiment according to any one of the first embodiment or the embodiments of the first embodiment. The function may be implemented by hardware, or may be implemented by hardware executing corresponding software. The hardware or the software includes one or more modules corresponding to the function. In some embodiments, the encoding apparatus includes: an encoding network module, configured to: transform a raw picture into feature space through a multilayer convolution operation, and extract features of different layers, such as layers 1, 2, . . . , and n or several layers thereof, in the feature space for compression, where characteristic frequencies of the layers 1, 2, . . . , and n sequentially decrease, a quantity of feature layers used for compression is variable, and a quantity of feature channels at each layer is variable, to achieve a dynamic compression adjustment capability; a rounding module, configured to round an output feature to an integer for subsequent encoding; an entropy estimation network module, configured to estimate a probability of each point in a rounded feature map obtained through rounding, so as to estimate a compression bit rate of a model; and an entropy encoding module, configured to perform entropy encoding on the rounded feature map based on probability distribution obtained by an entropy estimation model, to reduce encoding redundancy of the output feature and further reduce an amount of data transmitted during picture compression. These modules may perform corresponding functions in the method example according to any one of the first embodiment or the embodiments of the first embodiment. For details, refer to detailed descriptions in the method example. Details are not described herein again.

According to a tenth embodiment, the present disclosure relates to a decoding apparatus that has a function of implementing the behavior in the method embodiment according to any one of the second embodiment or the embodiments of the second embodiment. The function may be implemented by hardware, or may be implemented by hardware executing corresponding software. The hardware or the software includes one or more modules corresponding to the function. In some embodiments, the decoding apparatus includes: an entropy estimation network module, configured to estimate a probability of each point in a decoded feature map, so as to estimate a compression bit rate of a model; an entropy decoding module, configured to perform entropy decoding on a to-be-decoded bitstream based on probability distribution obtained by an entropy estimation model, to obtain a decoded feature map, where this reduces encoding redundancy of an output feature, and further reduces an amount of data transmitted during picture compression; and a decoding network module, configured to perform inverse transformation on a compressed feature to parse the decoded feature map into an audio or picture. These modules may perform corresponding functions in the method example according to any one of the second embodiment or the embodiments of the second embodiment. For details, refer to detailed descriptions in the method example. Details are not described herein again.

In a conventional mainstream end-to-end audio or picture coding scheme, there is an AE limit problem that model compression quality tends to be stable at a high bit rate of a fixed model. Although the AE limit problem can be alleviated by increasing computing power, a problem of high computing power occurs. In this application, transmission of feature signals at different layers (different feature layers) in feature space is added, and correlation between feature signals at different layers is utilized. This improves encoding quality and breaks through an AE limit. An encoding or decoding network corresponding to a feature layer with a high feature frequency has low computing power, so that complexity is reduced. According to an actual requirement for encoding quality, a quantity of layers and channels for compressing features can be adjusted, to be compatible with a current multi-bit-rate model, and implement a plurality of bit rates in a single model.

One or more embodiments are described in detail in the accompanying drawings and the following specification. Other features, objectives, and advantages are clear in the specification, accompanying drawings, and claims.

BRIEF DESCRIPTION OF DRAWINGS

The following describes accompanying drawings used in embodiments of this application.

DESCRIPTION OF EMBODIMENTS

Figure 1A:
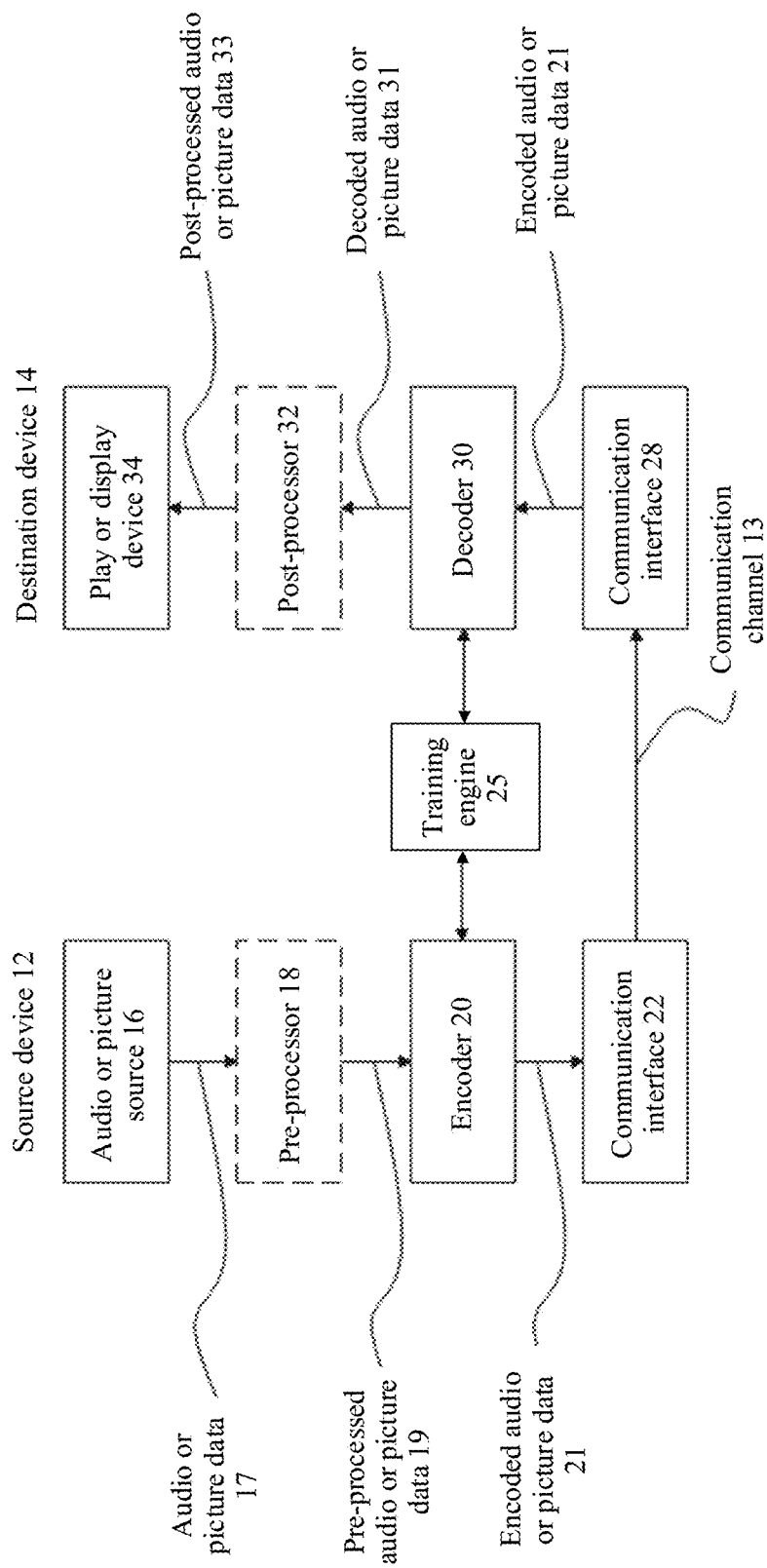
FIG. 1A is an example block diagram of an audio/video or picture decoding system for implementing embodiments of the present disclosure, where the system encodes or decodes a video or a picture by using a neural network.

Terms such as "first" and "second" in embodiments of this application are merely used for distinguishing and description, and should not be construed as an indication or implication of relative importance, or an indication or implication of an order. In addition, the terms "include", "comprise", and any variant thereof are intended to cover non-exclusive inclusion, for example, inclusion of a series of operations or units. A method, a system, a product, or a device is not necessarily limited to clearly listed operations or units, but may include other operations or units that are not clearly listed and that are inherent to the process, the method, the product, or the device.

It should be understood that, in this application, "at least one (item)" means one or more, and "a plurality of" means two or more. The term "and/or" describes an association relationship between associated objects, and represents that three relationships may exist. For example, "A and/or B" may represent the following three cases: Only A exists, only B exists, and both A and B exist, where A and B may be singular or plural. The character "/" usually indicates an "or" relationship between the associated objects. "At least one of the following items" or a similar expression thereof indicates any combination of the items, including any combination of one or more of the items. For example, at least one of a, b, or c may indicate a, b, c, "a and b", "a and c", "b and c", or "a, b, and c", where a, b, and c may be singular or plural.

Embodiments of this application provide an AI-based audio/video or picture compression technology, and in particular, provide a neural network-based audio/video or picture compression technology, and provide an end-to-end audio or picture coding system.

In the picture coding field, the terms "picture" and "image" may be used as synonyms. Picture coding (or usually referred to as coding) includes two parts: picture encoding and picture decoding, where a video includes a plurality of pictures, and is a representation of consecutive pictures. Audio coding (or usually referred to as coding) includes two parts: audio encoding and audio decoding. Audio or picture encoding is performed on a source side, and usually includes: processing (for example, compressing) a raw video picture to reduce an amount of data required for representing the audio or video picture (for more efficient storage and/or transmission). Audio or picture decoding is performed on a destination side, and usually includes: performing inverse processing relative to an encoder, to reconstruct an audio or a picture. "Coding" of an audio or a picture (or usually referred to as an audio or a picture) in embodiments should be understood as "encoding" or "decoding" of the audio or the picture. An encoding part and a decoding part are also collectively referred to as codec (encoding and decoding).

In the case of lossless audio or picture coding, a raw audio or picture can be reconstructed. To be specific, a reconstructed audio or picture has same quality as the raw audio or picture (assuming that no transmission loss or other data loss occurs during storage or transmission). In the case of conventional lossy picture coding, further compression is performed through quantization or the like, to reduce an amount of data required for representing an audio or a video picture, and the audio or the video picture cannot be fully reconstructed on a decoder side. To be specific, quality of a reconstructed audio or video picture is poorer than that of a raw audio or video picture.

Embodiments of this application relate to massive application of a neural network. Therefore, for ease of understanding, the following first describes related terms and concepts of the neural network that may be used in embodiments of this application.

(1) Neural Network

A neural network may include neurons. The neuron may be an operation unit that uses xs and an intercept of 1 as input. Output of the operation unit may be as follows:

$$h_{W,b}(x)=f(W^Tx)=f(\Sigma_{s=1}^{n}W_sx_s+b) \quad (1\text{-}1)$$

s=1, 2, . . . , n, n is a natural number greater than 1, Ws is a weight of xs, and b is bias of the neuron. f is an activation function of the neuron, and is used to introduce a nonlinear feature into the neural network, to convert an input signal in the neuron into an output signal. The output signal of the activation function may be used as input of a next convolutional layer, and the activation function may be a sigmoid function. The neural network is a network obtained by connecting a plurality of individual neurons. To be specific, output of a neuron may be input of another neuron. Input of each neuron may be connected to a local receptive field of a previous layer, to extract a feature of the local receptive field. The local receptive field may be a region including several neurons.

(2) Deep Neural Network

A deep neural network (DNN), also referred to as a multilayer neural network, may be understood as a neural network including a plurality of hidden layers. The DNN is divided based on locations of different layers, and a neural network in the DNN may be divided into three types: an input layer, a hidden layer, and an output layer. Usually, a first layer is the input layer, a last layer is the output layer, and intermediate layers are all hidden layers. Layers are fully connected. To be specific, any neuron at an $i^{th}$ layer is definitely connected to any neuron at an $(i+1)^{th}$ layer.

Although the DNN seems complex, an operation at each layer is not complex, and is simply expressed by the following linear relationship expression: $\vec{y}=\alpha(W\vec{x}+\vec{b})$, where $\vec{x}$ is an input vector, $\vec{y}$ is an output vector, $\vec{b}$ is an offset vector, W is a weight matrix (also referred to as a coefficient), and $\alpha()$ is an activation function. At each layer, only this simple operation is performed on the input vector $\vec{x}$ to obtain the output vector $\vec{y}$. Because the DNN includes many layers, there are also a large quantity of coefficients W and offset vectors $\vec{b}$. These parameters in the DNN are defined as follows: The coefficient W is used as an example. It is assumed that, in a three-layer DNN, a linear coefficient from a $4^{th}$ neuron at a second layer to a $2^{nd}$ neuron at a third layer is defined as $W_{24}^{3}$. The superscript 3 indicates a layer at which the coefficient W is located, and the subscript corresponds to an output third-layer index 2 and an input second-layer index 4.

To sum up, a coefficient from a $k^{th}$ neuron at an $(L-1)^{th}$ layer to a $j^{th}$ neuron at an $L^{th}$ layer is defined as $W_{jk}^{L}$.

It should be noted that the input layer does not have the W parameter. In the deep neural network, a larger quantity of hidden layers enable the network to describe a complex case in the real world. Theoretically, a model with more parameters has higher complexity and a larger "capacity", and can perform a more complex learning task. Training of the deep neural network is a process of learning a weight matrix, and a final objective of the training is to obtain weight matrices (weight matrices including vectors W of many layers) of all layers of a trained deep neural network.

(3) Convolutional Neural Network

A convolutional neural network (CNN) is a deep neural network with a convolutional structure. The convolutional neural network includes a feature extractor that includes a convolutional layer and a sampling sublayer, and the feature extractor may be considered as a filter. The convolutional layer is a neuron layer, in the convolutional neural network, at which convolution is performed on an input signal. At the convolutional layer of the convolutional neural network, one neuron may be connected only to some neurons at adjacent layers. One convolutional layer usually includes several feature planes, and each feature plane may include some neurons arranged in a rectangular shape. Neurons at one feature plane share a weight, and the shared weight herein is a convolution kernel. The weight sharing may be understood as that a manner of extracting picture information is irrelevant to a location. The convolution kernel may be initialized in a form of a matrix with a random size. During training of the convolutional neural network, the convolution kernel may obtain an appropriate weight through learning. In addition, direct benefits of the weight sharing lie in that connections between layers of the convolutional neural network are reduced, and an overfitting risk is also reduced.

(4) A recurrent neural network (RNN) is used for processing sequence data. In a conventional neural network model, from an input layer to a hidden layer and then to an output layer, the layers are fully connected, but nodes at each layer are not connected. This common neural network helps resolve many problems, but is still incapable of resolving many other problems. For example, if a next word in a sentence needs to be predicted, a preceding word usually needs to be used because adjacent words in a sentence are not independent of each other. A reason why the RNN is referred to as the recurrent neural network is that current output of a sequence is related to previous output. A specific representation form is as follows: The network memorizes previous information and applies the previous information to calculation of current output. To be specific, nodes at the hidden layer are connected to each other, and input of the hidden layer not only includes output of the input layer, but also includes output of the hidden layer at a previous moment. Theoretically, the RNN can process sequence data of any length. Training for the RNN is the same as training for a conventional CNN or DNN. The RNN is intended to make a machine capable of memorizing like a human. Therefore, output of the RNN needs to depend on current input information and historical memorized information.

(5) Loss Function

During training of a deep neural network, because output of the deep neural network is expected to be close to an actually expected predicted value as much as possible, a current predicted value of the network may be compared with an actually expected target value, and then a weight vector of each layer of the neural network is updated based on a difference between the two values (certainly, there is usually an initialization process before a first update, to be specific, a parameter is preconfigured for each layer of the deep neural network). For example, if the predicted value of the network is large, the weight vector is adjusted to reduce the predicted value, until the deep neural network can obtain, through prediction, the actually expected target value or a value quite close to the actually expected target value. Therefore, "how to obtain, through comparison, a difference between a predicted value and a target value" needs to be predefined. This is a loss function or an objective function. The loss function and the objective function are important equations for measuring a difference between a predicted value and a target value. The loss function is used as an example. A larger output value (loss) of the loss function indicates a greater difference. Therefore, the training of the deep neural network is a process of minimizing the loss.

(6) Back Propagation Algorithm

During training of a neural network, an error back propagation (BP) algorithm may be used to correct a value of a parameter in an initial neural network model, so that reconstruction error loss of the neural network model becomes increasingly small. In some embodiments, an input signal is transferred forward until error loss occurs at output, and the parameter in the initial neural network model is updated based on back propagation error loss information, to make the error loss converge. The back propagation algorithm is an error-loss-centered back propagation motion intended to obtain an optimal parameter, for example, a weight matrix, of the neural network model.

(7) Generative Adversarial Network

A generative adversarial network (GAN) is a deep learning model. The model includes at least two modules. One module is a generative model, and the other module is a discriminative model. Learning is performed through a game between the two modules, to generate better output. Both the generative model and the discriminative model may be neural networks, and may be deep neural networks or convolutional neural networks. A basic principle of the GAN is as follows: A GAN for generating an image is used as an example. It is assumed that there are two networks: G (Generator) and D (Discriminator). G is a network for generating an image. G receives random noise z, and generates an image based on the noise, where the image is denoted as G(z). D is a discriminative network for determining whether an image is "real". An input parameter of D is x, where x indicates an image. Output D(x) indicates a probability that x is a real image. If a value of D(x) is 1, it indicates that the image is 100% a real image. If the value of D(x) is 0, it indicates that the image cannot be a real image. During training of the generative adversarial network, an objective of the generative network G is to generate an image that is as real as possible to deceive the discriminative network D, and an objective of the discriminative network D is to distinguish between an image generated by G and a real image. In this way, G and D constitute a dynamic "game" process, namely, an "adversarial" process in the "generative adversarial network". A final game result is as follows: In an ideal state, G may generate an image G(z) that "seems real", and it is difficult for D to determine whether the image generated by G is real, that is, D(G(z))=0.5. In this way, a superb generative model G is obtained, and may be used to generate an image.

In the following embodiment of a decoding system 10, an encoder 20 and a decoder 30 are described based on FIG. 1A to FIG. 13.

FIG. 1A is a schematic block diagram of an example decoding system 10, for example, an audio/video or picture decoding system 10 (or referred to as a decoding system 10) capable of using technologies of this application. A video encoder 20 (or referred to as an encoder 20) and an audio/video or picture decoder 30 (or referred to as a decoder 30) in the audio/video or picture decoding system 10 represent devices capable of performing technologies based on examples described in this application, or the like.

As shown in FIG. 1A, the decoding system 10 includes a source device 12. The source device 12 is configured to provide encoded audio or picture data 21, such as an encoded audio or picture, for a destination device 14 configured to decode the encoded audio or picture data 21.

The source device 12 includes the encoder 20, and in addition, may include an audio or picture source 16, a pre-processor (or a pre-processing unit) 18 such as an audio or picture pre-processor, and a communication interface (or a communication unit) 22.

The audio or picture source 16 may include or may be any type of audio or picture capture device for capturing a real-world picture or the like, and/or any type of picture generation device, for example, a computer graphics processing unit for generating a computer animated picture, or any type of device for obtaining and/or providing a real-world picture or a computer generated picture (for example, screen content, a virtual reality (VR) picture, and/or any combination thereof (for example, an augmented reality (AR) picture)). The audio or picture source may be any type of internal memory or memory for storing any audio or picture in the foregoing pictures.

To distinguish processing performed by the pre-processor (or the pre-processing unit) 18, an audio or picture (or picture data) 17 may also be referred to as a raw audio or picture (or raw picture data) 17.

The pre-processor 18 is configured to receive the (raw) audio or picture data 17 and pre-process the audio or picture data 17 to obtain a pre-processed picture (or pre-processed picture data) 19. For example, the pre-processing performed by the pre-processor 18 may include trimming, color format conversion (for example, conversion from RGB to YCbCr), color correction, or denoising. It can be understood that the pre-processing unit 18 may be an optional component.

The audio/video or picture encoder (or the encoder) 20 is configured to receive the pre-processed audio or picture data 19, and provide the encoded audio or picture data 21 (this is further described below based on FIG. 2 and the like).

The communication interface 22 of the source device 12 may be configured to receive the encoded audio or picture data 21, and send the encoded audio or picture data 21 (or any another processed version) to another device such as the destination device 14 or any other device through a communication channel 13, for storage or direct reconstruction.

The destination device 14 includes the decoder 30, and in addition, may include a communication interface (or a communication unit) 28, a post-processor (or a post-processing unit) 32, and a display device 34.

The communication interface 28 of the destination device 14 is configured to: directly receive the encoded audio or picture data 21 (or any further processed version) from the source device 12 or any other source device such as a storage device, where for example, the storage device is a storage device for encoded audio or picture data; and provide the encoded audio or picture data 21 for the decoder 30.

The communication interface 22 and the communication interface 28 may be configured to send or receive the encoded audio or picture data (or encoded data) 21 through a direct communication link between the source device 12 and the destination device 14, for example, a direct wired or wireless connection, or any type of network such as a wired network, a wireless network, or any combination thereof, or any type of private network or public network or any combination thereof.

For example, the communication interface 22 may be configured to encapsulate the encoded audio or picture data 21 into an appropriate format such as a packet, and/or process the encoded audio or picture data through any type of transmission encoding or processing, so that processed encoded audio or picture data can be transmitted through a communication link or a communication network.

The communication interface 28 corresponds to the communication interface 22, and for example, may be configured to receive transmitted data, and process the transmitted data through any type of corresponding transmission decoding or processing and/or decapsulation to obtain the encoded audio or picture data 21.

The communication interface 22 and the communication interface 28 each may be configured as a unidirectional communication interface indicated by an arrow, in FIG. 1A, that corresponds to the communication channel 13 and that is directed from the source device 12 to the destination device 14, or a bidirectional communication interface, and may be configured to: send and receive messages or the like to establish a connection, determine and exchange any other information related to a communication link and/or data transmission such as transmission of encoded picture data, and the like.

The audio/video or picture decoder (or the decoder) 30 is configured to receive the encoded audio or picture data 21, and provide decoded audio or picture data (or decoded audio or picture data) 31 (this is further described below based on FIG. 4 and the like).

The post-processor 32 is configured to post-process the decoded audio or picture data (also referred to as reconstructed audio or picture data) 31 such as a decoded audio or picture, to obtain post-processed audio or picture data 33 such as a post-processed audio or picture. For example, the post-processing performed by the post-processing unit 32 may include color format conversion (for example, conversion from YCbCr to RGB), color correction, trimming, resampling, or any other processing for generating the decoded audio or picture data 31 to be displayed by the display device 34 or the like.

The display device 34 is configured to receive the post-processed audio or picture data 33, to display a picture to a user, a viewer, or the like. The display device 34 may be or include any type of player or display for representing the reconstructed audio or picture, for example, an integrated or external display or monitor. For example, the display may include a liquid crystal display (LCD), an organic light emitting diode (OLED) display, a plasma display, a projector, a micro-LED display, a liquid crystal on silicon (LCoS) display, a digital light processor (DLP), or any other type of display.

The decoding system 10 further includes a training engine 25. The training engine 25 is configured to train the encoder 20 or the decoder 30 for processing (for example, processing an input audio, picture, picture region, or picture block to generate a predicted value of the input audio, picture, picture region, or picture block). Training data may be stored in a database (not shown), and the training engine 25 obtains a target model (which may be, for example, a network used for audio or picture encoding or decoding) through training based on the training data. It should be noted that a source of the training data is not limited in this embodiment of this application. For example, the training data may be obtained from a cloud or another place for model training.

Although FIG. 1A shows the source device 12 and the destination device 14 as separate devices, device embodiments may alternatively include both the source device 12 and the destination device 14, or may include functions of both the source device 12 and the destination device 14, that is, may include both the source device 12 or a corresponding function and the destination device 14 or a corresponding function. In these embodiments, the source device 12 or the corresponding function and the destination device 14 or the corresponding function may be implemented by using same hardware and/or software, separate hardware and/or software, or any combination thereof.

Based on the descriptions, existence and (accurate) division of different units or functions in the source device 12 and/or the destination device 14 shown in FIG. 1A may vary based on actual devices and applications. This is clear to a person skilled in the art.

Figure 1B:
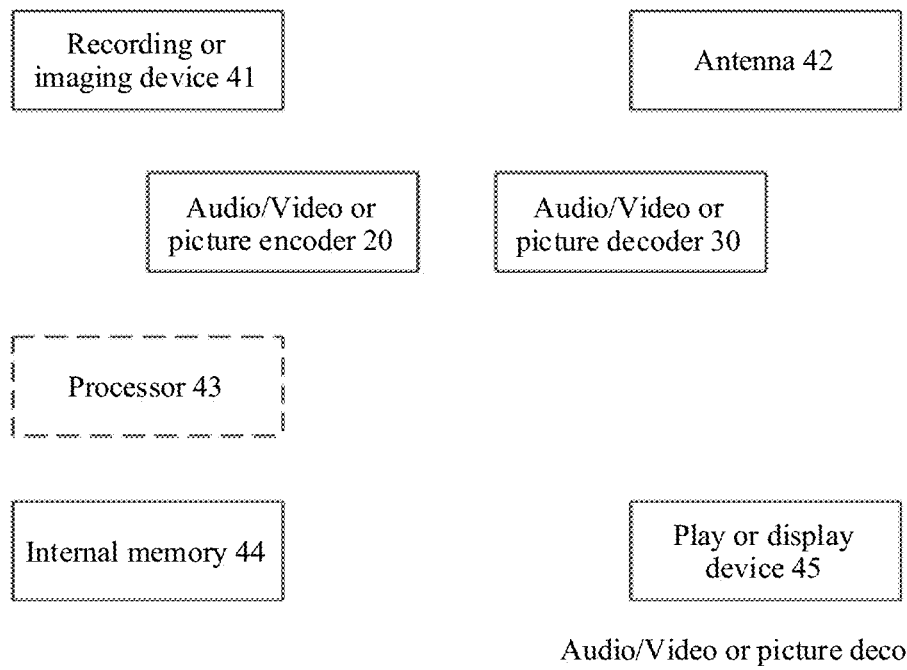
FIG. 1B is another example block diagram of an audio/video or picture decoding system for implementing embodiments of the present disclosure, where a video or picture encoder and/or a video or picture decoder encodes or decodes a video or a picture by using a neural network.

The encoder 20 (for example, the audio/video or picture encoder 20), the decoder 30 (for example, the audio/video or picture decoder 30), or both the encoder 20 and the decoder 30 may be implemented by using a processing circuit shown in FIG. 1B, for example, one or more microprocessors, a digital signal processor (DSP), an application-specific integrated circuit (ASIC), a field-programmable gate array (FPGA), discrete logic, hardware, a dedicated processor for audio/video or picture encoding, or any combination thereof. The encoder 20 may be implemented by using a processing circuit 46, to include various modules described with reference to an encoder 20 in FIG. 2 and/or any other encoder system or subsystem described in this specification. The decoder 30 may be implemented by using a processing circuit 46, to include various modules described with reference to a decoder 30 in FIG. 4 and/or any other decoder system or subsystem described in this specification. The processing circuit 46 may be configured to perform various operations described below. As shown in FIG. 7, if some technologies are implemented in software, a device may store software instructions in a suitable non-transitory computer-readable storage medium, and execute the instructions in hardware through one or more processors, to perform technologies of the present disclosure. One of the audio/video or picture encoder 20 and the audio/video or picture decoder 30 may be integrated in a single device as a part of a combined encoder/decoder (CODEC), as shown in FIG. 1B.

The source device 12 and the destination device 14 may include any one of a variety of devices, including any type of handheld device or stationary device, for example, a notebook computer, a laptop computer, a mobile phone, a smartphone, a tablet or tablet computer, a camera, a desktop computer, a set-top box, a television, a display device, a digital media player, a video gaming console, a video streaming device (for example, a content business server or a content delivery server), a broadcast receiver device, or a broadcast transmitter device, and may not use an operating system or may use any type of operating system. In some cases, the source device 12 and the destination device 14 may be equipped with components for wireless communication. Therefore, the source device 12 and the destination device 14 may be wireless communication devices.

In some cases, the audio/video or picture decoding system 10 shown in FIG. 1A is merely an example. Technologies provided in this application are applicable to audio/video or picture encoding settings (for example, audio/video or picture encoding, or video or picture decoding). These settings do not necessarily include any data communication between an encoding device and a decoding device. In another example, data is retrieved from a local memory and is transmitted through a network. An audio/video or picture encoding device may encode data and store encoded data in a memory, and/or an audio/video or picture decoding device may retrieve the data from the memory and decode the data. In some examples, encoding and decoding are performed by devices that do not communicate with each other but only encode data to a memory and/or retrieve data from a memory and decode the data.

FIG. 1B is a schematic diagram of an example of a video or picture decoding system 40 that includes the audio/video or picture encoder 20 in FIG. 1A and/or the audio/video or picture decoder 30 in FIG. 1B according to an example embodiment. The audio/video or picture decoding system 40 may include an imaging device 41, an audio/video or picture encoder 20, an audio/video or picture decoder 30 (and/or an audio/video or picture encoder/decoder implemented by using the processing circuit 46), an antenna 42, one or more processors 43, one or more internal memories 44, and/or a display device 45.

As shown in FIG. 1B, the imaging device 41, the antenna 42, the processing circuit 46, the audio/video or picture encoder 20, the audio/video or picture decoder 30, the processor 43, the internal memory 44, and/or the display device 45 can communicate with each other. In different examples, the audio/video or picture decoding system 40 may include only the audio/video or picture encoder 20 or only the audio/video or picture decoder 30.

In some examples, the antenna 42 may be configured to transmit or receive an encoded bitstream of audio/video or picture data. In addition, in some examples, the display device 45 may be configured to display audio/video or picture data. The processing circuit 46 may include application-specific integrated circuit (ASIC) logic, a graphics processing unit, a general-purpose processor, or the like. The audio/video or picture decoding system 40 may also include an optional processor 43. Similarly, the optional processor 43 may include application-specific integrated circuit (ASIC) logic, a graphics processing unit, a general-purpose processor, or the like. In addition, the internal memory 44 may be any type of memory, for example, a volatile memory (for example, a static random access memory (SRAM) or a dynamic random access memory (DRAM)), or a nonvolatile memory (for example, a flash memory). In a non-restrictive example, the internal memory 44 may be implemented by using a cache memory. In another example, the processing circuit 46 may include a memory (for example, a cache) for implementing a picture buffer, or the like.

In some examples, the audio/video or picture encoder 20 implemented by using a logic circuit may include an audio or picture buffer (which is implemented by using, for example, the processing circuit 46 or the internal memory 44) and an audio or graphics processing unit (which is implemented by using, for example, the processing circuit 46). The audio or graphics processing unit may be communicatively coupled to the picture buffer. The audio or graphics processing unit may include the audio/video or picture encoder 20 implemented by using the processing circuit 46, to implement various modules described with reference to FIG. 2 and/or any other encoder system or subsystem described in this specification. The logic circuit may be configured to perform various operations described in this specification.

In some examples, the audio/video or picture decoder 30 may be implemented by using the processing circuit 46 in a similar manner, to implement various modules described with reference to the audio/video or picture decoder 30 in FIG. 1B and/or any other decoder system or subsystem described in this specification. In some examples, the audio/video or picture decoder 30 implemented by using a logic circuit may include an audio or picture buffer (which is implemented by using the processing circuit 46 or the internal memory 44) and an audio or graphics processing unit (which is implemented by using, for example, the processing circuit 46). The audio or graphics processing unit may be communicatively coupled to the picture buffer. The audio or graphics processing unit may include the audio/video or picture decoder 30 implemented by using the processing circuit 46, to implement various modules described with reference to FIG. 4 and/or any other decoder system or subsystem described in this specification.

In some examples, the antenna 42 may be configured to receive an encoded bitstream of audio/video or picture data. As described, the encoded bitstream may include data, an indicator, an index value, mode selection data, or the like that is related to audio/video frame encoding and that is described in this specification, for example, data related to code partitioning (for example, a transform coefficient or a quantized transform coefficient, an optional indicator (as described), and/or data defining the code partitioning). The audio/video or picture decoding system 40 may further include the audio/video or picture decoder 30 that is coupled to the antenna 42 and that is configured to decode the encoded bitstream. The display device 45 is configured to display a video frame.

It should be understood that, in this embodiment of this application, in an example described with reference to the audio/video or picture encoder 20, the audio/video or picture decoder 30 may be configured to perform a reverse process. For a signaling syntax element, the audio/video or picture decoder 30 may be configured to receive and parse the syntax element, and correspondingly decode related video data. In some examples, the audio/video or picture encoder 20 may perform entropy encoding on the syntax element to obtain an encoded bitstream. In these examples, the audio/video or picture decoder 30 may parse the syntax element, and correspondingly decode related audio/video or picture data.

Figure 1C:
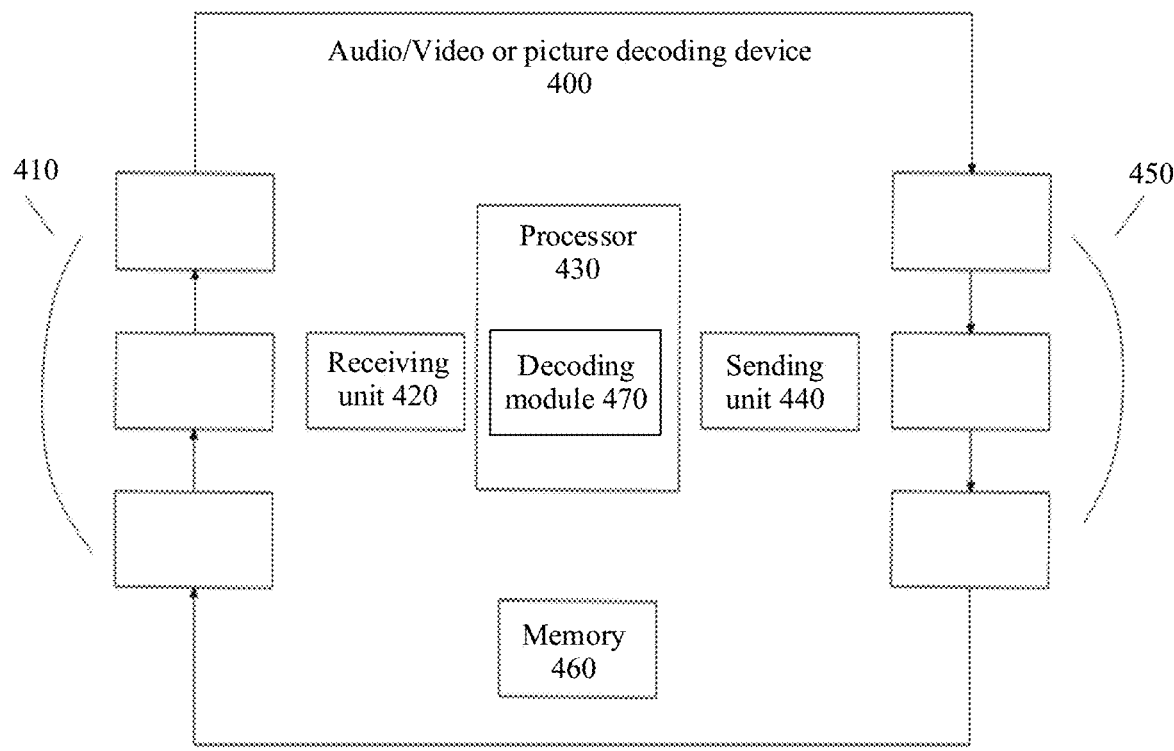
FIG. 1C is a schematic block diagram of an audio/video or picture decoding device for implementing embodiments of the present disclosure.

FIG. 1C is a schematic diagram of an audio/video or picture decoding device 400 according to an embodiment of the present disclosure. The audio/video or picture decoding device 400 is suitable for implementing disclosed embodiments described in this specification. In an embodiment, the audio/video or picture decoding device 400 may be a decoder, for example, the audio/video or picture decoder 30 in FIG. 1A, or may be an encoder, for example, the audio/video or picture encoder 20 in FIG. 1A.

The audio/video or picture decoding device 400 includes: an ingress port 410 (or an input port 410) and a receiver unit (Rx) 420 for receiving data; a processor, a logic unit, or a central processing unit (CPU) 430 for processing the data, for example, the processor 430 may be a neural network processing unit 430; a transmitter unit (Tx) 440 and an egress port 450 (or an output port 450) for transmitting the data; and a memory 460 for storing the data. The audio/video or picture decoding device 400 may further include an optical-to-electrical (OE) component and an electrical-to-optical (EO) component that are coupled to the ingress port 410, the receiver unit 420, the transmitter unit 440 and the egress port 450 and that serve as an egress or an ingress of an optical signal or an electrical signal.

The processor 430 is implemented by using hardware and software. The processor 430 may be implemented as one or more processor chips, cores (for example, a multi-core processor), FPGAs, ASICs, or DSPs. The processor 430 communicates with the ingress port 410, the receiver unit 420, the transmitter unit 440, the egress port 450, and the memory 460. The processor 430 includes a decoding module 470 (for example, a neural network NN-based decoding module 470). The decoding module 470 implements the foregoing disclosed embodiments. For example, the decoding module 470 performs, processes, prepares, or provides various encoding operations. Therefore, the decoding module 470 provides a substantial improvement on functions of the audio/video or picture decoding device 400, and affects switching of the audio/video or picture decoding device 400 between different states. Alternatively, the decoding module 470 is implemented by using instructions that are stored in the memory 460 and that are to be executed by the processor 430.

The memory 460 includes one or more magnetic disks, magnetic tapes, or solid-state drives, and may serve as an overflow data storage device, to store a program when the program is selected for execution, and to store instructions and data that are read during program execution. The memory 460 may be volatile and/or nonvolatile, and may be a read-only memory (ROM), a random access memory (RAM), a ternary content-addressable memory (TCAM), and/or a static random access memory (SRAM).

Figure 1D:
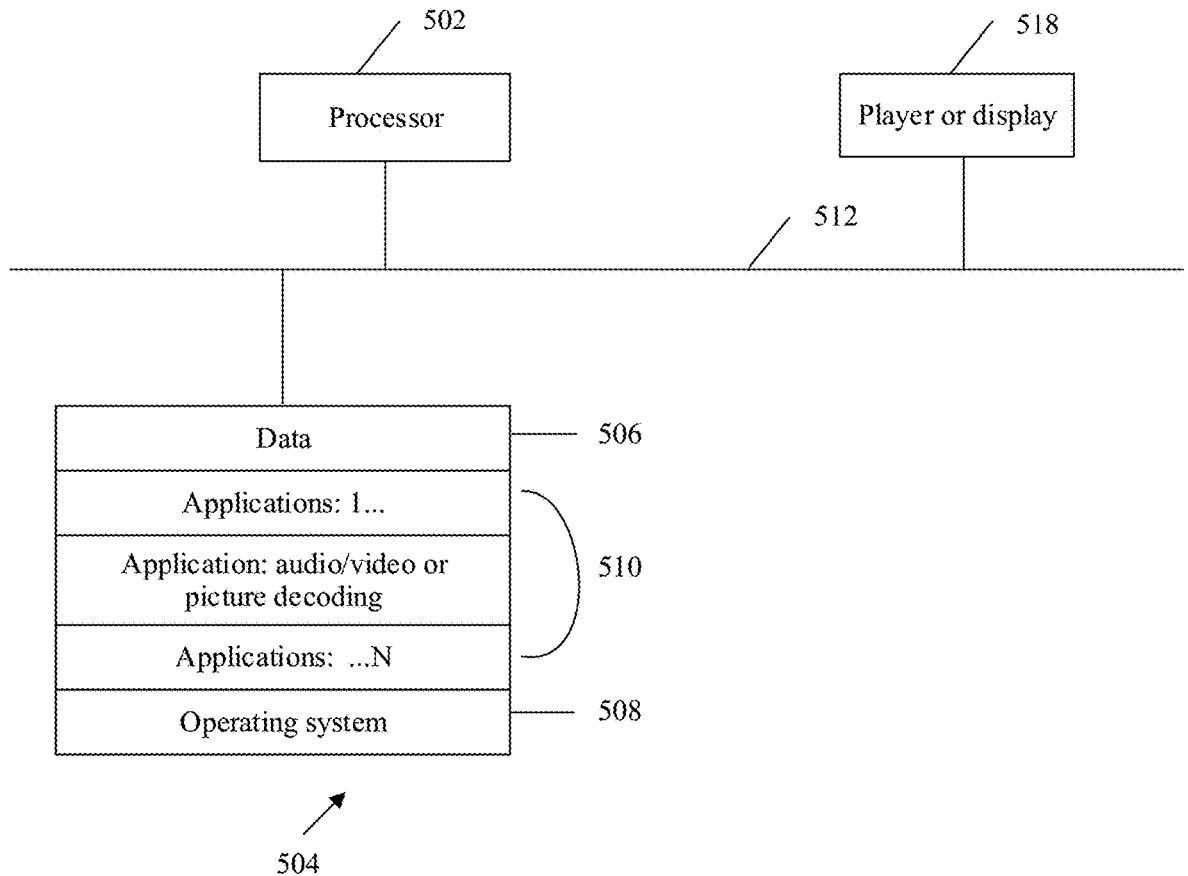
FIG. 1D is a schematic block diagram of an audio/video or picture decoding apparatus for implementing embodiments of the present disclosure.

FIG. 1D is a simplified block diagram of an apparatus 500 according to an example embodiment. The apparatus 500 may serve as either or both of the source device 12 and the destination device 14 in FIG. 1A.

A processor 502 in the apparatus 500 may be a central processing unit. Alternatively, the processor 502 may be any other type of device or a plurality of devices that currently exist or are to be developed in the future and that are capable of manipulating or processing information. Although disclosed embodiments may be implemented by a single processor such as the processor 502 shown in the figure, a speed and efficiency are higher when more than one processor is used.

In an embodiment, a memory 504 in the apparatus 500 may be a read-only memory (ROM) device or a random access memory (RAM) device. Any other suitable type of storage device may serve as the memory 504. The memory 504 may include code and data 506 that is accessed by the processor 502 through a bus 512. The memory 504 may further include an operating system 508 and an application program 510. The application program 510 includes at least one program that enables the processor 502 to perform a method described in this specification. For example, the application program 510 may include applications 1 to N, and may further include an audio/video or picture decoding application for performing the method described in this specification.

The apparatus 500 may further include one or more output devices, such as a display 518. In an example, the display 518 may be a touch-sensitive display obtained by combining a display with a touch-sensitive element capable of sensing touch input. The display 518 may be coupled to the processor 502 through the bus 512.

Although the bus 512 in the apparatus 500 is described as a single bus in this specification, the bus 512 may include a plurality of buses. In addition, an auxiliary memory may be directly coupled to another component of the apparatus 500 or may be accessed through a network, and may include a single integrated unit such as a memory card, or a plurality of units such as a plurality of memory cards. Therefore, the apparatus 500 may have a variety of configurations.

Encoder and Encoding Method

Figure 2:
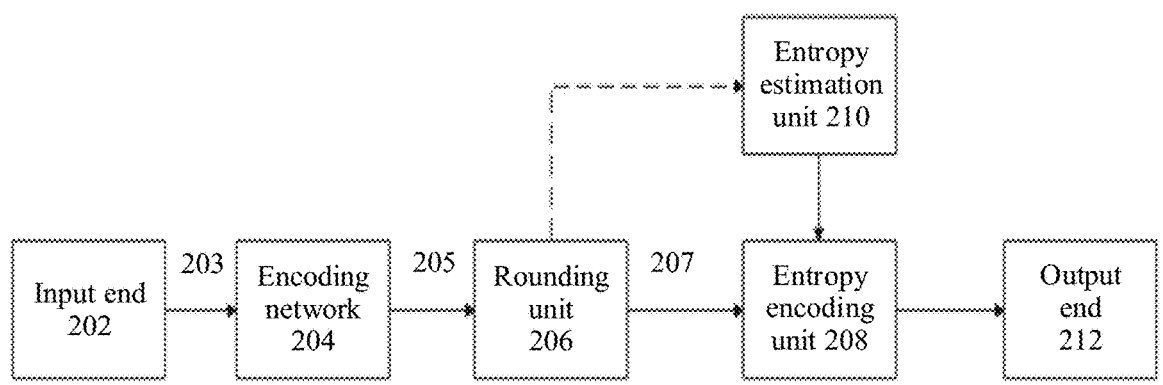
FIG. 2 is an example block diagram of an encoder system for implementing embodiments of the present disclosure.

FIG. 2 is a schematic block diagram of an example of an audio/video or picture encoder 20 for implementing technologies of this application. In the example in FIG. 2, the audio/video or picture encoder 20 includes an input end (or an input interface) 202, an encoding network 204, rounding 206, entropy encoding 208, entropy estimation 210, and an output end (or an output interface) 212. The audio/video encoder 20 shown in FIG. 2 may also be referred to as an end-to-end audio or picture encoder or an audio or picture encoder based on an end-to-end audio or picture codec.

The encoder 20 may be configured to receive an audio or picture (or audio or picture data) 17 through the input end 202 or the like, for example, an audio or picture that forms an audio/video or video sequence. The received audio or picture, or audio or picture data may alternatively be a pre-processed audio or picture (or pre-processed audio or picture data) 19. For simplicity, the audio or picture 17 is used in the following descriptions. The audio or picture 17 may also be referred to as a current audio or picture or audio or a to-be-encoded audio or picture (especially when the current audio or picture is distinguished from another audio in audio/video encoding, the another audio or picture, for example, in a same audio or video sequence, also includes a previous encoded audio or picture and/or decoded audio or picture in an audio or video sequence of the current audio or picture).

A (digital) picture is or may be considered as a two-dimensional array or matrix including samples with intensity values. A sample in an array may also be referred to as a pixel (or pel, which is short for a picture element). A quantity of samples of an array or a picture in a horizontal direction and a vertical direction (or axes) defines a size and/or a resolution of the picture. Three color components are usually used to represent a color. To be specific, a picture may be represented as or include three sample arrays. In an RBG format or color space, a picture includes corresponding red, green and blue sample arrays. However, in video or picture encoding, each pixel is usually represented in a luminance/chrominance format or as color space, for example, YCbCr, which includes a luminance component (sometimes also denoted as L) indicated by Y and two chrominance components indicated by Cb and Cr. The luminance (luma) component Y represents luminance or grayscale intensity (for example, the luminance and the grayscale intensity are the same in a grayscale picture), and the two chrominance (chrominance, chroma for short) components Cb and Cr represent chrominance or color information components. Correspondingly, a picture in a YCbCr format includes a luminance sample array of luminance sample values (Y) and two chrominance sample arrays of chrominance values (Cb and Cr). A picture in an RGB format may be converted or transformed into a YCbCr format, and vice versa. This process is also referred to as color transformation or conversion. If a picture is in black and white, the picture may include only a luminance sample array. Correspondingly, the picture may be, for example, a luminance sample array in a monochrome format, or a luminance sample array and two corresponding chrominance sample arrays in a color format of 4:2:0, 4:2:2, or 4:4:4.

In a possibility, an embodiment of the video or picture encoder 20 may include a picture partitioning unit (not shown in FIG. 1A or FIG. 1B), configured to partition the picture 17 into a plurality of (usually, non-overlapping) picture blocks 203. These blocks may also be referred to as root blocks, macro blocks (H.264/AVC), coding tree blocks (CTB) or coding tree units (CTU) in the H.265/HEVC and VVC standards. The partitioning unit may be configured to use a same block size and use a corresponding grid that defines the block size for all pictures in a video sequence, or change a block size between pictures, picture subsets, or picture groups, and partition each picture into corresponding blocks.

In another possibility, the video or picture encoder may be configured to directly receive the block 203 of the picture 17, for example, one or more or all blocks that constitute the picture 17. The picture block 203 may also be referred to as a current picture block or a to-be-encoded picture block.

Similar to the picture 17, the picture block 203 is also or may also be considered as a two-dimensional array or matrix including samples with intensity values (sample values). However, the picture block 203 is smaller than the picture 17. In other words, the block 203 may include one sample array (for example, a luminance array in the case of a monochrome picture 17, or a luminance array or a chrominance array in the case of a color picture), three sample arrays (for example, one luminance array and two chrominance arrays in the case of a color picture 17), or any other quantity and/or types of arrays based on a used color format. A quantity of samples of the block 203 in a horizontal direction and a vertical direction (or axes) defines a size of the block 203. Correspondingly, the block may be an M×N (M columns×N rows) sample array, or an M×N transform coefficient array, or the like.

In another possibility, the audio/video or picture encoder 20 shown in FIG. 1A, FIG. 1B, or FIG. 2 is configured to encode the picture 17 per block, for example, perform encoding, rounding, and entropy encoding on each block 203.

In another possibility, the audio/video or picture encoder 20 shown in FIG. 1A, FIG. 1B, or FIG. 2 is configured to encode the picture 17, for example, perform encoding, quantization, and entropy encoding on the picture 17.

In another possibility, the audio/video or picture encoder 20 shown in FIG. 1A, FIG. 1B, or FIG. 2 is configured to encode the audio data 17, for example, perform encoding, quantization, and entropy encoding on the audio data 17.

In another possibility, the audio/video or picture encoder 20 shown in FIG. 1A, FIG. 1B, or FIG. 2 may be further configured to partition an encoded picture by slice (also referred to as a video slice), where the picture may be partitioned or encoded into one or more (usually, non-overlapping) slices. Each slice may include one or more blocks (for example, a coding tree unit CTU) or one or more block groups (for example, a tile in the H.265/HEVC/VVC standards and a subpicture in the VVC standard).

In another possibility, the audio/video or picture encoder 20 shown in FIG. 1A, FIG. 1B, or FIG. 2 may be further configured to partition an audio by segment, where the audio may be partitioned or encoded into one or more (usually, non-overlapping) segments.

In another possibility, the audio/video or picture encoder 20 shown in FIG. 1A, FIG. 1B, or FIG. 2 may be further configured to partition and/or encode a picture by slice/tile group (also referred to as a video tile group) and/or by tile (also referred to as a video tile), where the picture may be partitioned or encoded into one or more (usually, non-overlapping) slice/tile groups. Each slice/tile group may include one or more blocks (for example, a CTU), one or more tiles, or the like. Each tile may be in a rectangular shape or the like, and may include one or more complete or partial blocks (for example, a CTU).

Encoding Network Unit 204

As shown in FIG. 2, the encoding network unit 204 is configured to obtain an output feature map 205 of each feature layer through an encoding network based on input data 203. The encoding network unit outputs at least two output feature maps 205 corresponding to two or more feature layers.

Figure 3A:
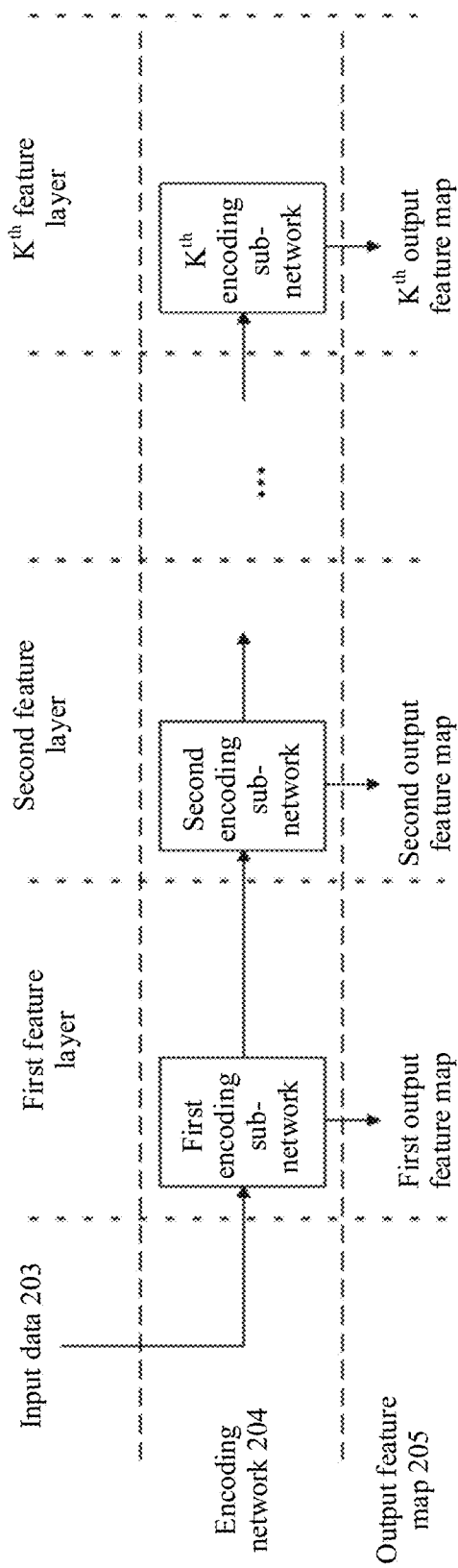
FIG. 3A shows an example framework of an encoding network of an audio or picture encoder for implementing embodiments of the present disclosure.

In a possibility, the encoding network unit is shown in FIG. 3A. The encoding network unit includes K encoding sub-networks, and each encoding sub-network corresponds to a feature layer and a corresponding output feature map. In this case, K output feature maps are output, where K≥2.

In a possibility, input of the encoding network is a to-be-encoded audio or picture or a to-be-encoded audio segment or picture block.

Figure 3B:
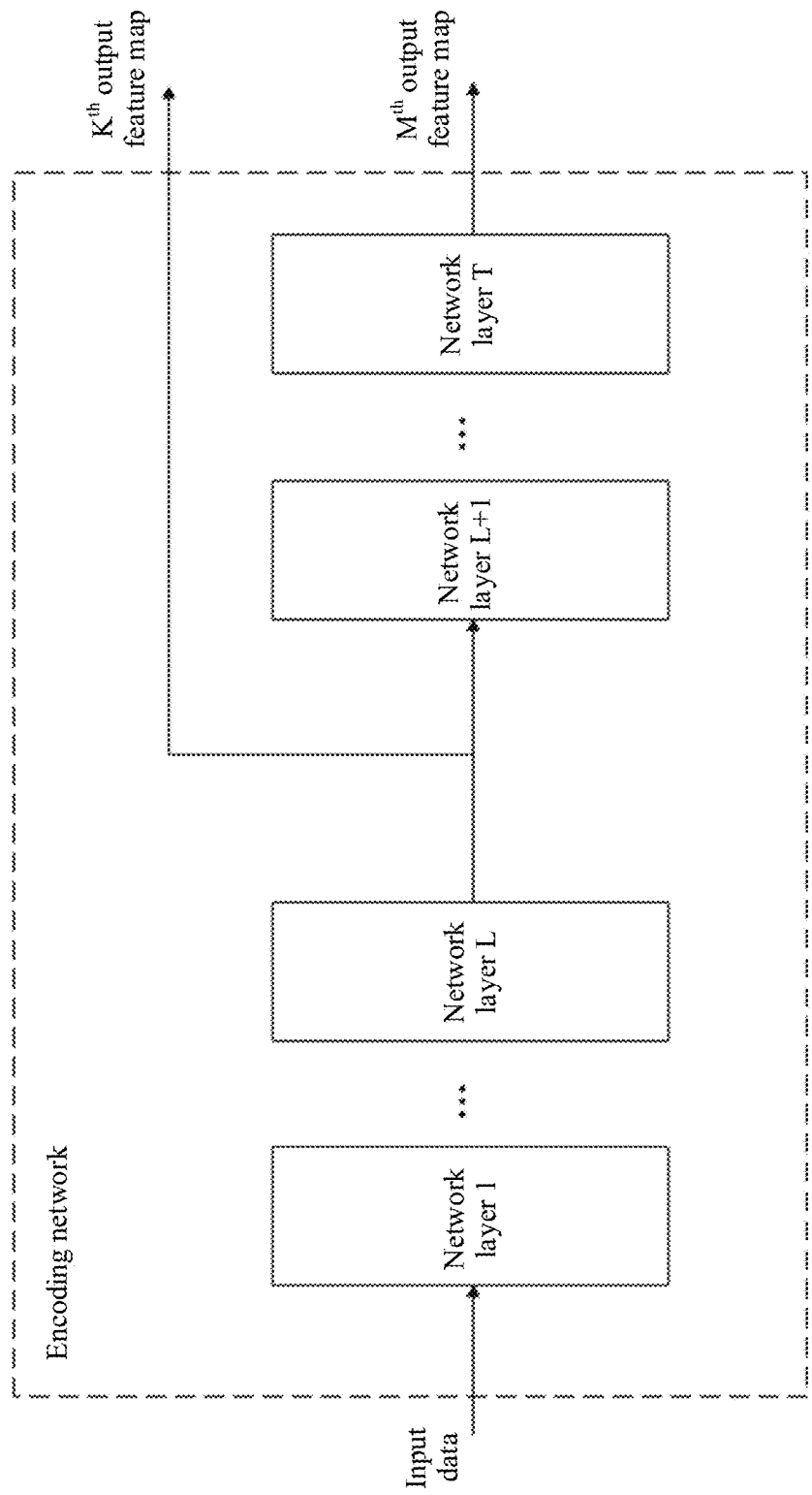
FIG. 3B shows an input/output structure of an encoding network of an audio or picture encoder for implementing embodiments of the present disclosure.

In a possibility, an input/output structure of the encoding network in the encoding network 204 is shown in FIG. 3B. The encoding network unit includes T network layers, where M, L, T, and K are positive integers. Both an $M^{th}$ output feature map and a $K^{th}$ output feature map are output of the encoding network. In addition, the $K^{th}$ output feature map output by the encoding network is output after a network layer L in the encoding network unit, and the $M^{th}$ output feature map is output after a network layer T. It can be understood that a plurality of output feature maps may be output after locations of different network layers in the encoding network unit. This is not limited herein.

Any network layer in FIG. 3B may be a convolutional layer, a normalization layer, a nonlinear activation layer, or the like.

Figure 4:
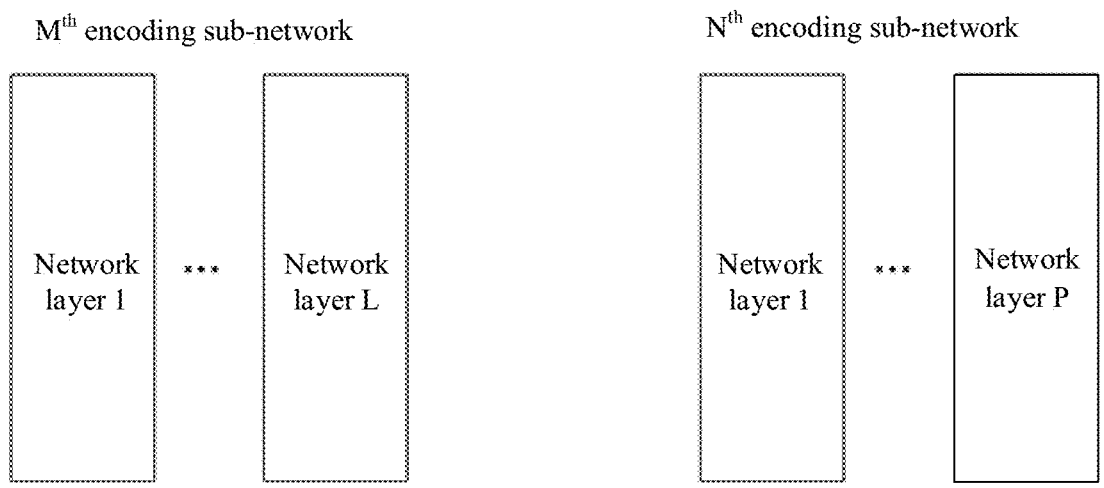
FIG. 4 is a diagram of an example structure of an encoding sub-network for implementing embodiments of the present disclosure.

In a possibility, structures of encoding sub-networks corresponding to FIG. 3A in the encoding network 204 may be the same as or different from each other, and structures of an $M^{th}$ encoding sub-network and an $N^{th}$ encoding sub-network are shown in FIG. 4. A structure of a network layer 1 in the $M^{th}$ encoding sub-network may be different from a structure of any network layer in the $N^{th}$ encoding sub-network, L and P may be the same or different, and both L and P are positive integers greater than 0.

Figure 5:
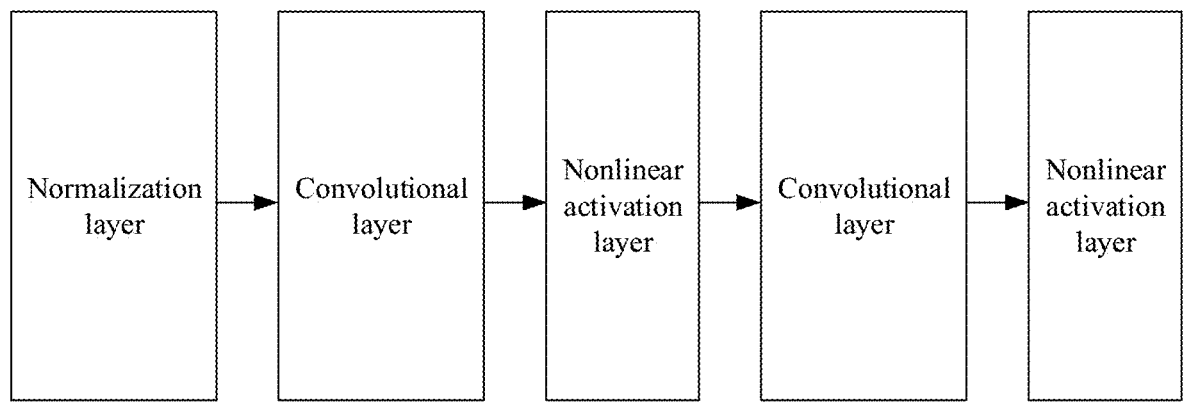
FIG. 5 is an example diagram of an encoding network.

In a possibility, an example of a network structure of any encoding sub-network in the encoding network 204 is shown in FIG. 5. It can be learned that an $N^{th}$ encoding sub-network in the example includes five network layers, and includes one normalization layer, two convolutional layers, and two nonlinear activation layers.

Rounding Unit 206

The rounding unit 206 is configured to round the output feature map 205 through, for example, scalar quantization or vector quantization, to obtain a rounded feature map 207.

In a possibility, the audio/video or picture encoder 20 (correspondingly, the rounding unit 206) may be configured to output a rounding parameter (quantization parameter, QP), for example, directly output the quantization parameter or output a quantization parameter encoded or compressed by an entropy encoding unit 270, so that, for example, the audio/video decoder 30 can receive and use the quantization parameter for decoding.

Figure 6A:
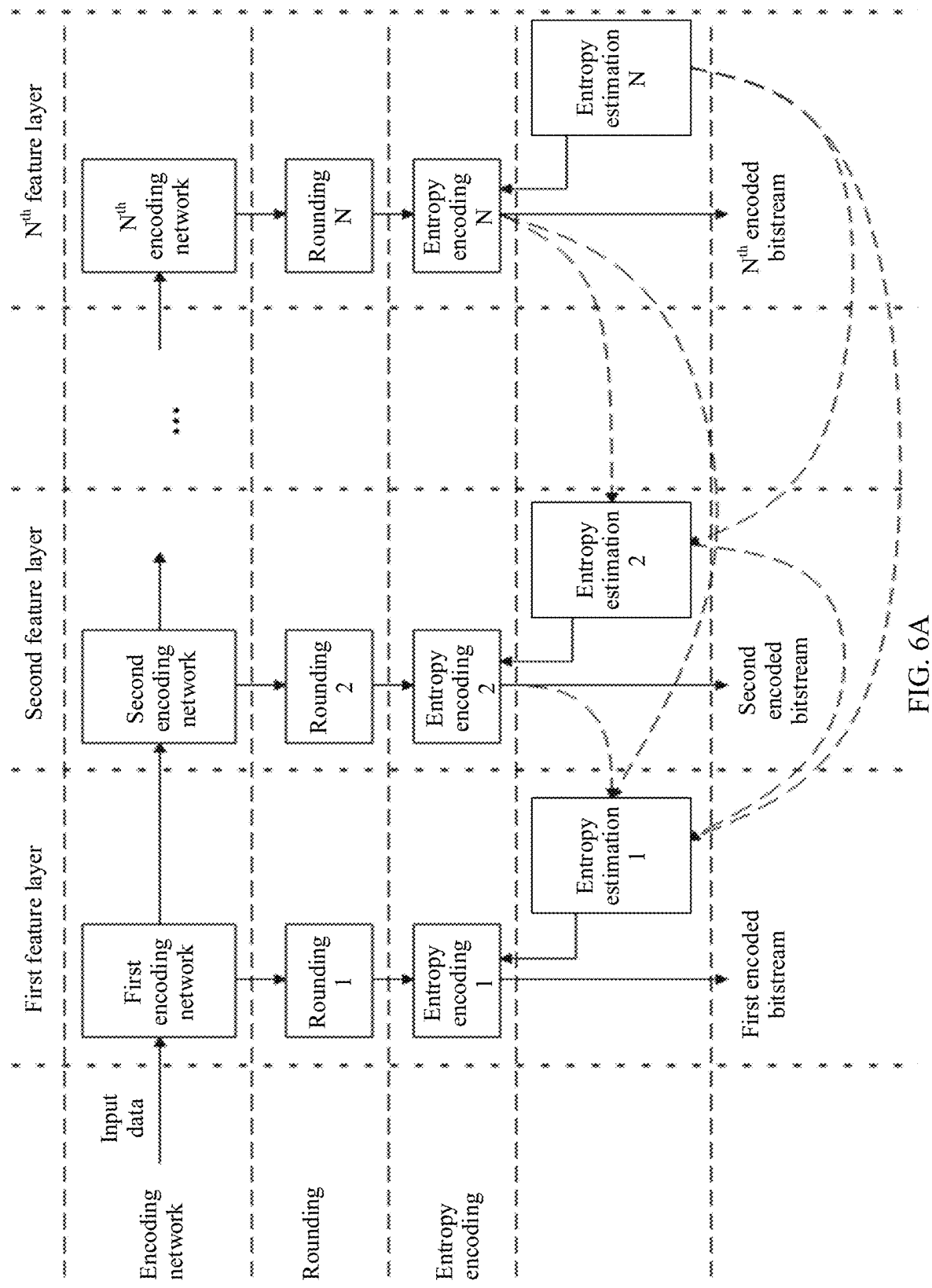
FIG. 6A and FIG. 6B are example block diagrams of an entropy estimation unit.

As shown in FIG. 6A, a rounding operation is performed on all output feature maps of N feature layers, to output N rounded feature maps, where N is a positive integer greater than 1.

In a possibility, an output feature map is pre-processed before rounding, including: subtracting a pixel value of a sample in the output feature map and a mean output by entropy estimation to obtain an offset feature map, and rounding the obtained offset feature map to obtain a rounded feature map.

Entropy Encoding Unit 208

The entropy encoding unit 208 is configured to apply an entropy encoding algorithm or scheme (for example, a variable-length encoding (variable-length coding, VLC) scheme, a context-adaptive VLC (CALVC) scheme, an arithmetic encoding scheme, a binarization algorithm, context-adaptive binary arithmetic encoding (CABAC), syntax-based context-adaptive binary arithmetic encoding (SBAC), probability interval partitioning entropy (PIPE) encoding, or another entropy encoding method or technology) to rounded feature maps of at least two feature layers, to obtain the encoded audio or picture data 21 that can be output through the output end 212 in a form of the encoded bitstream 21 or the like, so that the video decoder 30 or the like can receive and use a parameter for decoding. The encoded bitstream 21 may be transmitted to the video decoder 30, or may be stored in a memory and then transmitted or retrieved by the video decoder 30.

In a possibility, because a real character probability of a rounded feature map is not known in entropy encoding, statistics may be collected on the information or related information as required, the information may be added to the entropy encoding module, and the information may be transmitted to the decoder side.

Entropy Estimation Unit 210

As shown in FIG. 6A, the entropy estimation unit 210 is configured to perform probability estimation on a rounded feature map to estimate a compression bit rate of a model. Input indicated by dashed lines is optional input. The entropy estimation unit 210 corresponds to N entropy estimation modules corresponding to N feature layers.

Figure 6B:
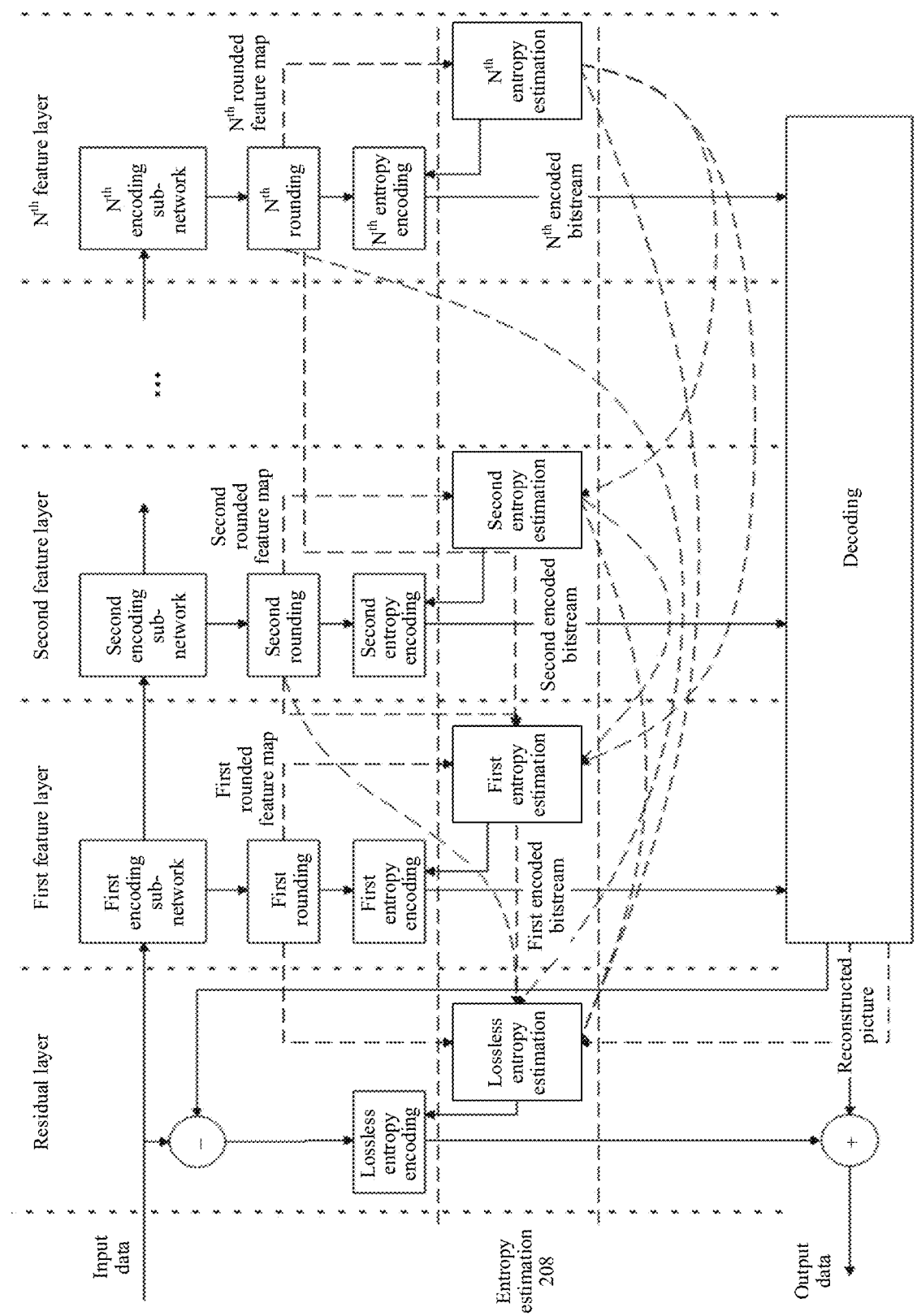

As shown in FIG. 6B, the entropy estimation unit 210 is configured to perform probability estimation on a rounded feature map to estimate a compression bit rate of a model. Input indicated by dashed lines is optional input. The entropy estimation unit 210 corresponds to N entropy estimation modules corresponding to N feature layers, and a lossless entropy estimation module corresponding to a residual layer.

Figure 7A:
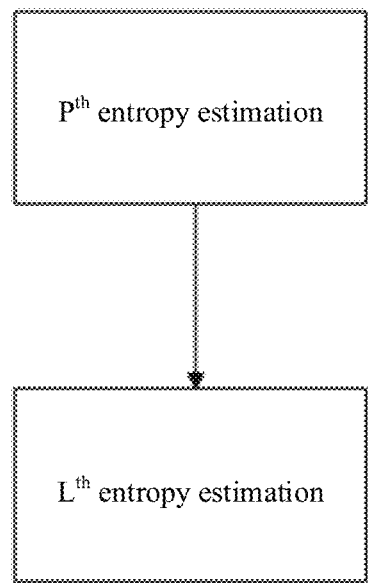
FIG. 7A to FIG. 7M are example block diagrams of input of entropy estimation.

In a possibility, as shown in FIG. 7A, a $P^{th}$ entropy estimation result in the encoder is input of $L^{th}$ entropy estimation, where L and P are positive integers, and L<P.

Figure 7B:
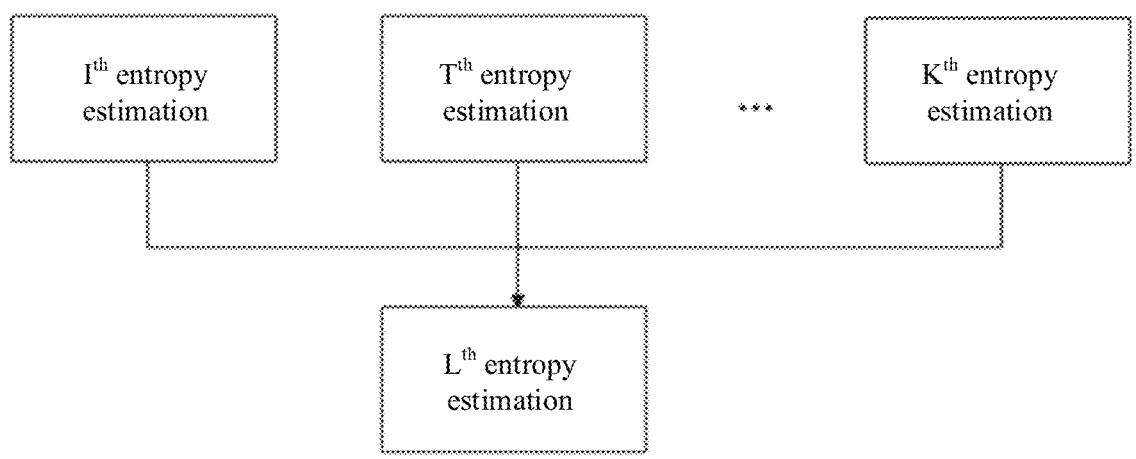

In another possibility, a plurality of entropy estimation results in the encoder are input of $L^{th}$ entropy estimation, and a sequence number of a feature layer corresponding to each of a plurality of entropy estimation modules is greater than L, where L is a positive integer. As shown in FIGS. 7B, L, I, T, and K are all positive integers, L<I, L<T, and L<K.

Figure 7C:
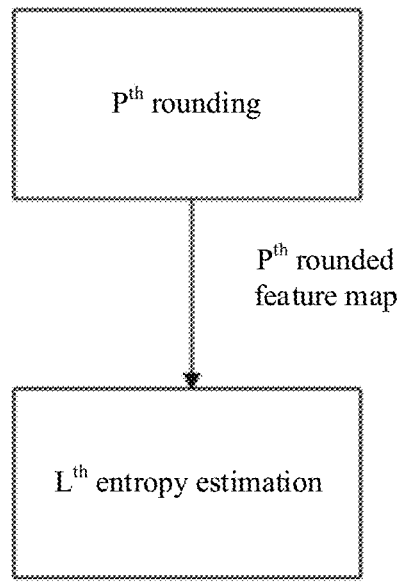

In a possibility, as shown in FIG. 7C, a $P^{th}$ rounded feature map in the encoder is input of $L^{th}$ entropy estimation, where L and P are positive integers, and L≤P.

Figure 7D:
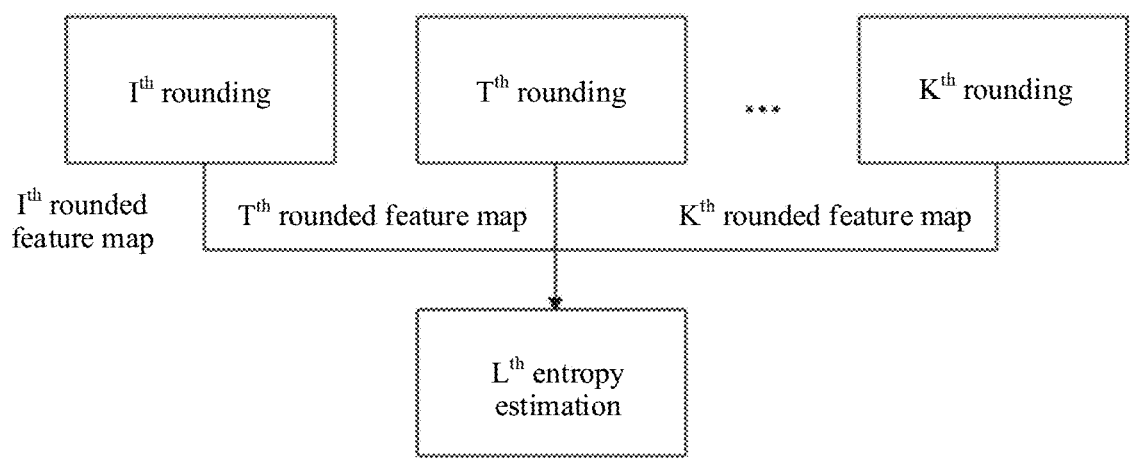

In another possibility, a plurality of rounded feature maps in the encoder are input of $L^{th}$ entropy estimation, and a sequence number of a feature layer corresponding to each of a plurality of rounding modules is greater than L, where L is a positive integer. As shown in FIGS. 7D, L, I, T, and K are all positive integers, L≤I, L≤T, and L<K.

Figure 7E:
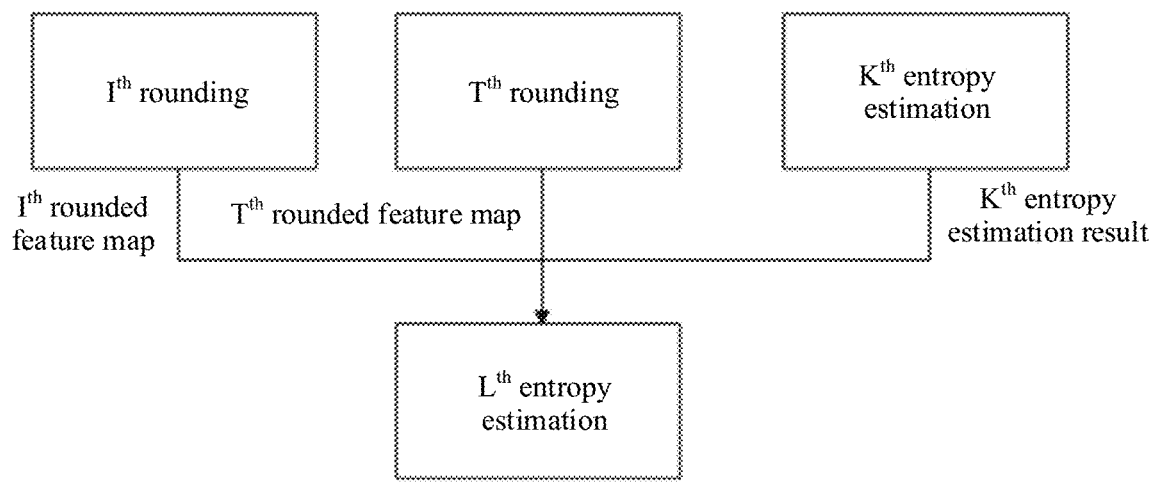

In a possibility, at least one rounded feature map and at least one entropy estimation result in the encoder are input of $L^{th}$ entropy estimation, where L is a positive integer. A sequence number of a feature layer corresponding to a rounded feature map used as input of the $L^{th}$ entropy estimation is greater than or equal to L, and a sequence number of a feature layer corresponding to an entropy estimation result used as input of the $L^{th}$ entropy estimation is greater than L. As shown in FIGS. 7E, L, I, T, and K are all positive integers, L≤I, L≤T, and L<K.

Figure 7F:
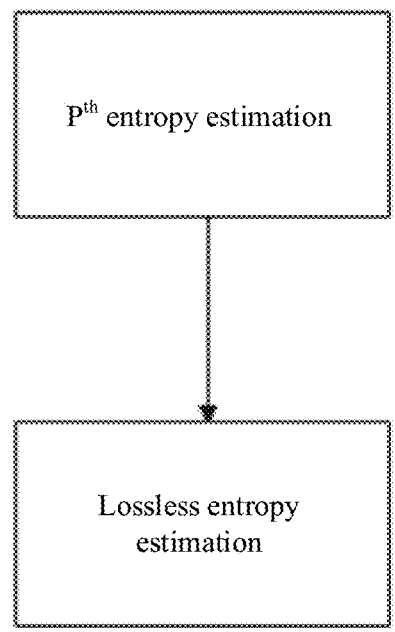

In a possibility, as shown in FIG. 7F, a $P^{th}$ entropy estimation result in the encoder is input of lossless entropy estimation, where P is a positive integer.

Figure 7G:
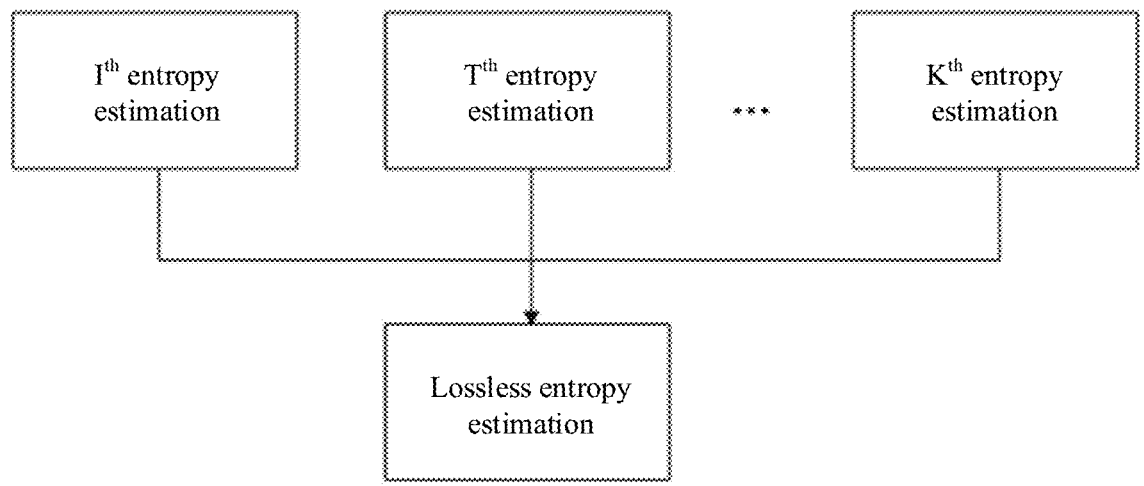

In another possibility, a plurality of entropy estimation results in the encoder are input of lossless entropy estimation. For example, as shown in FIGS. 7G, I, T, and K are all positive integers.

Figure 7H:
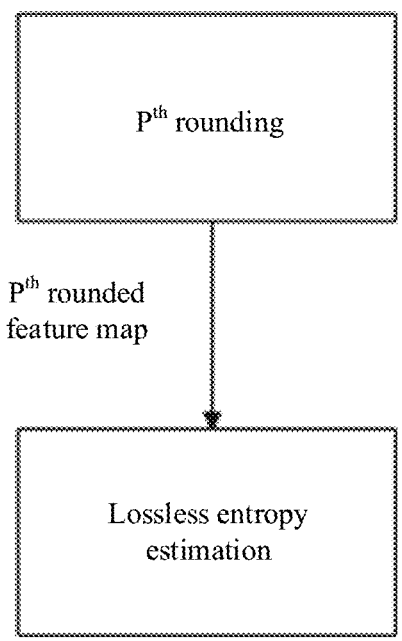

In a possibility, as shown in FIG. 7H, a $P^{th}$ rounded feature map in the encoder is input of lossless entropy estimation, where P is a positive integer.

Figure 7I:
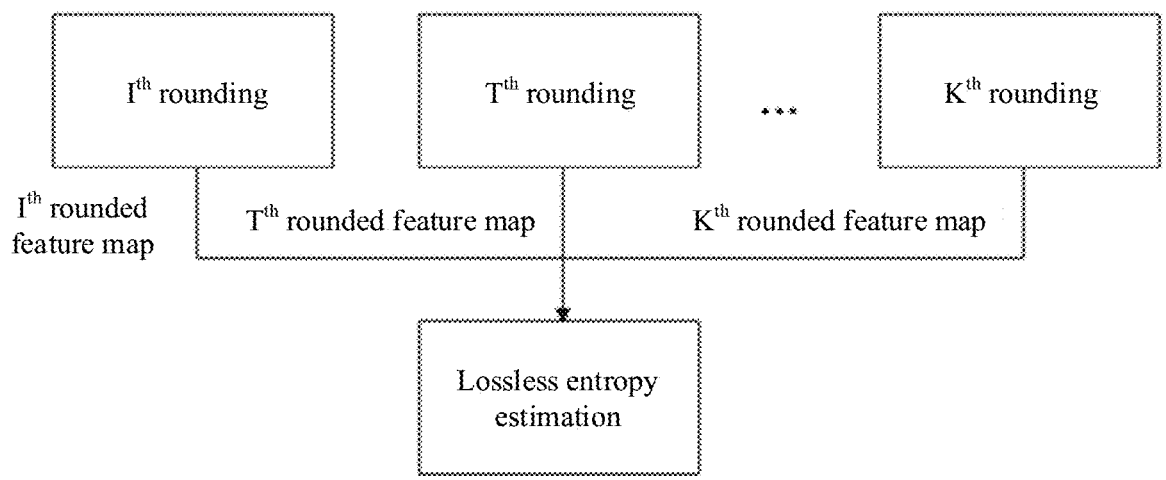

In another possibility, a plurality of rounded feature maps in the encoder are input of lossless entropy estimation. For example, as shown in FIGS. 7I, I, T, and K are all positive integers.

Figure 7J:
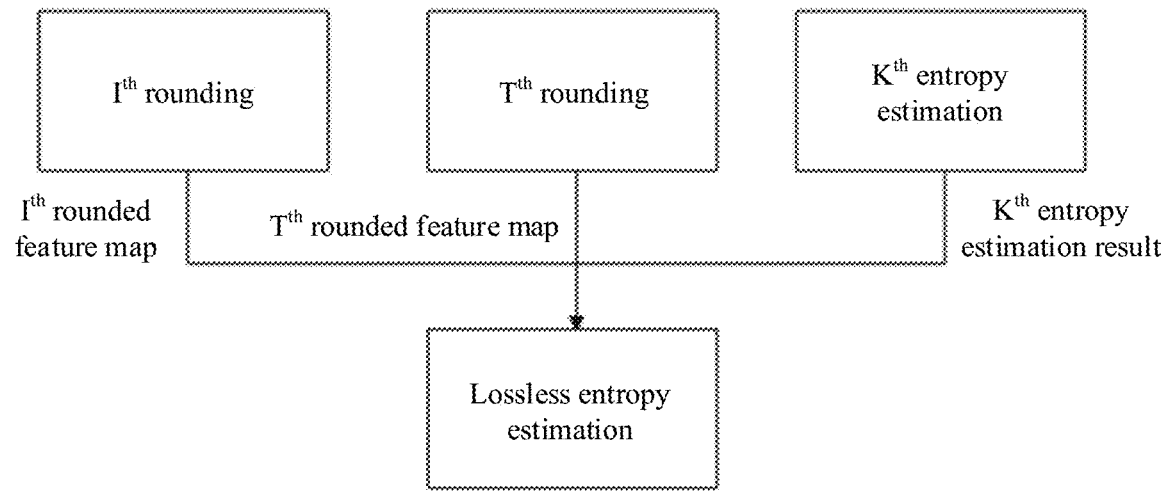

In a possibility, at least one rounded feature map and at least one entropy estimation result in the encoder are input of lossless entropy estimation. For example, as shown in FIGS. 7J, I, T, and K are all positive integers.

Figure 7K:
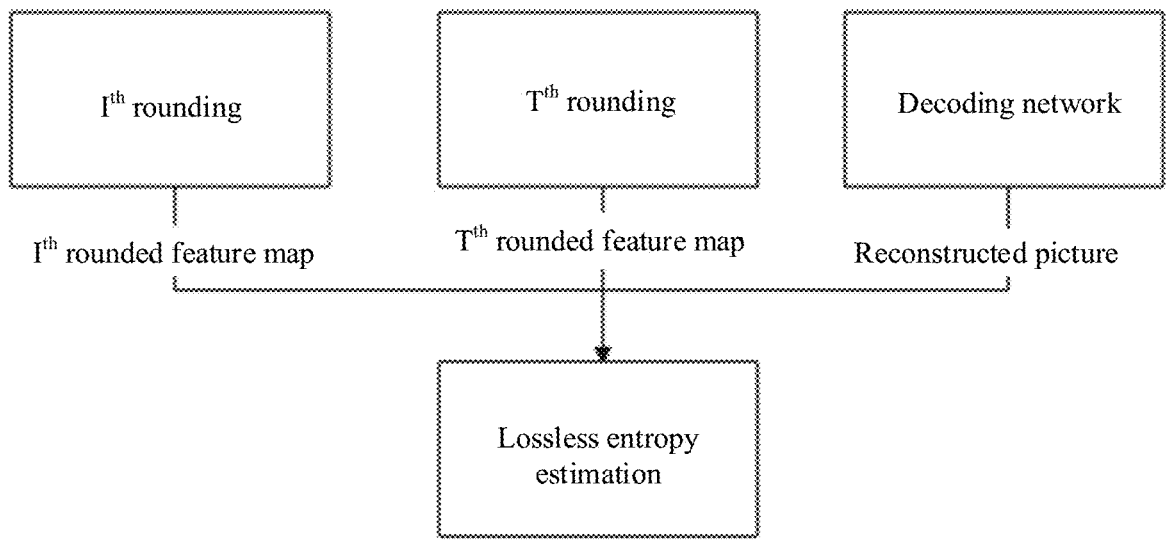

In one possibility, at least one rounded feature map and a reconstructed audio or picture in the encoder are input of lossless entropy estimation. For example, as shown in FIGS. 7K, I and T are both positive integers.

Figure 7L:
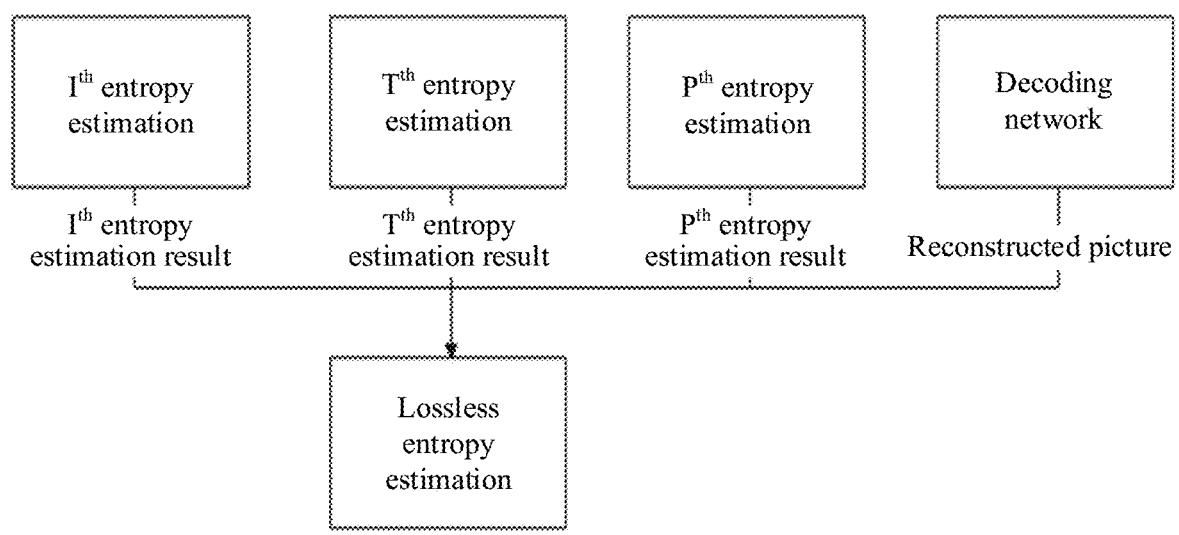

In a possibility, at least one entropy estimation result and a reconstructed audio or picture in the encoder are input of lossless entropy estimation. For example, as shown in FIGS. 7L, I and T are both positive integers.

Figure 7M:
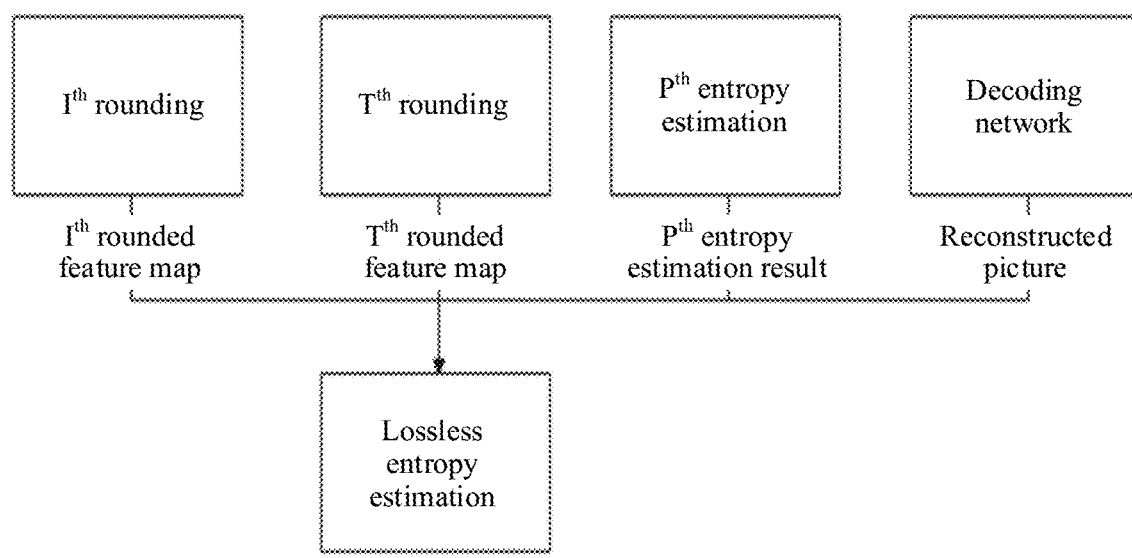
Figure 8:
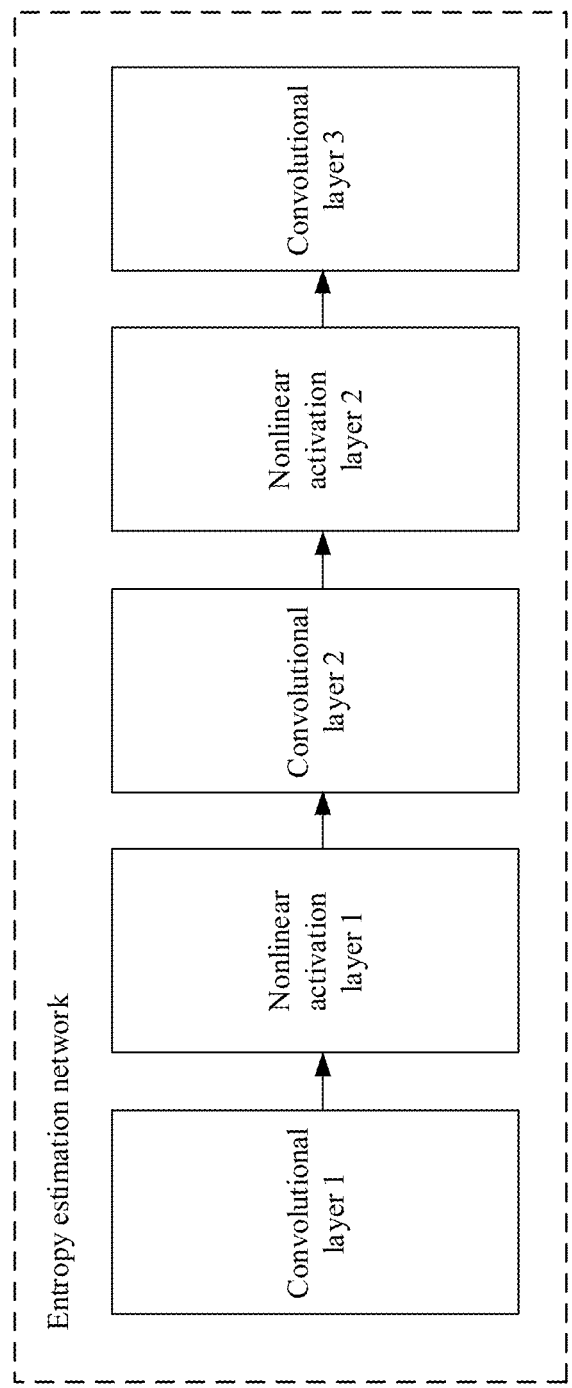
FIG. 8 shows an example entropy estimation network.

In a possibility, at least one entropy estimation result, a reconstructed audio or picture, and at least one rounded feature map in the encoder are input of lossless entropy estimation. For example, as shown in FIGS. 7M, I, T, and P are all positive integers.

In a possibility, an entropy estimation network is a convolutional network, and the convolutional network includes a convolutional layer and a nonlinear activation layer. It can be learned that an entropy estimation network in an example in FIG. 8 includes five network layers, and includes three convolutional layers and two nonlinear activation layers.

Decoder and Decoding Method

Figure 9:
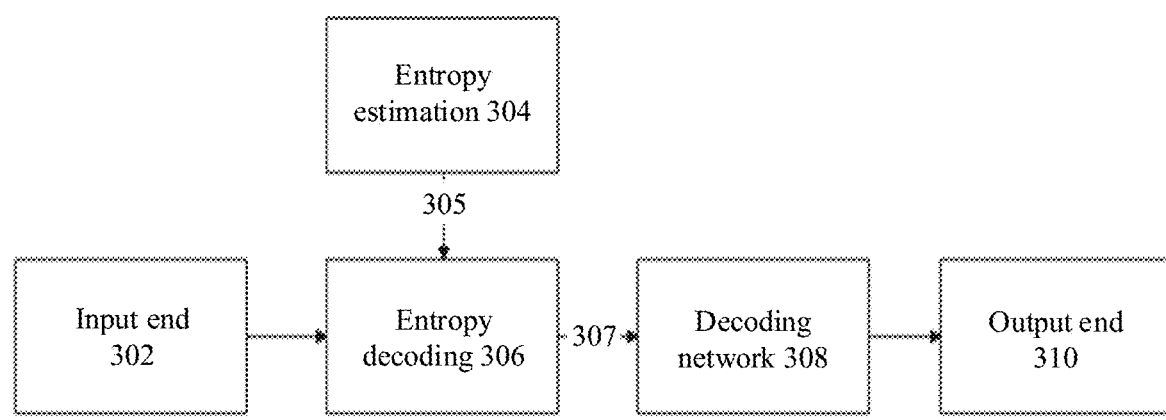
FIG. 9 is a schematic block diagram of a decoder system for implementing embodiments of the present disclosure.

FIG. TA and FIG. 1B show the example audio/video or picture decoder 30 for implementing technologies of this application. As shown in FIG. 9, the audio/video or picture decoder 30 is configured to receive, for example, the encoded audio or picture data 21 (for example, the encoded bitstream 21) encoded by the encoder 20, to obtain a decoded audio or picture 308. The encoded picture data or bitstream includes information for decoding the encoded picture data, for example, data representing a picture block of an encoded video slice (and/or a tile group or a tile) and a related syntax element. In the example of FIG. 9, the decoder 30 includes an entropy estimation unit 304, an entropy decoding unit 306, and a decoding network unit 308.

Entropy Estimation Unit 304

Figure 10A:
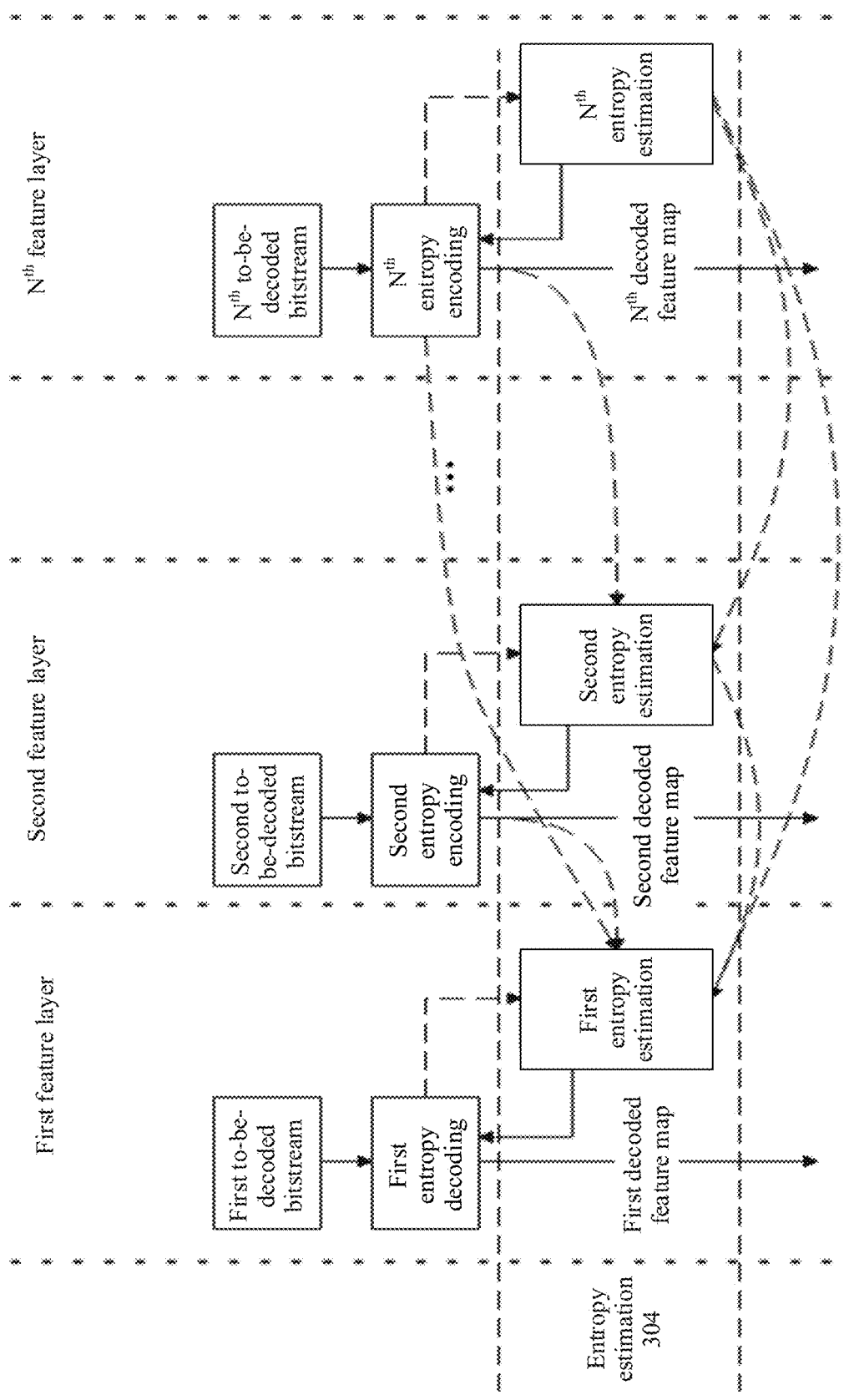
FIG. 10A and FIG. 10B are schematic diagrams of a framework of an entropy estimation unit for decoding.

As shown in FIG. 10A, the entropy estimation unit 304 is configured to perform probability estimation on a decoded feature map. Input indicated by dashed lines is optional input. The entropy estimation unit 304 corresponds to N entropy estimation modules corresponding to N feature layers.

Figure 10B:
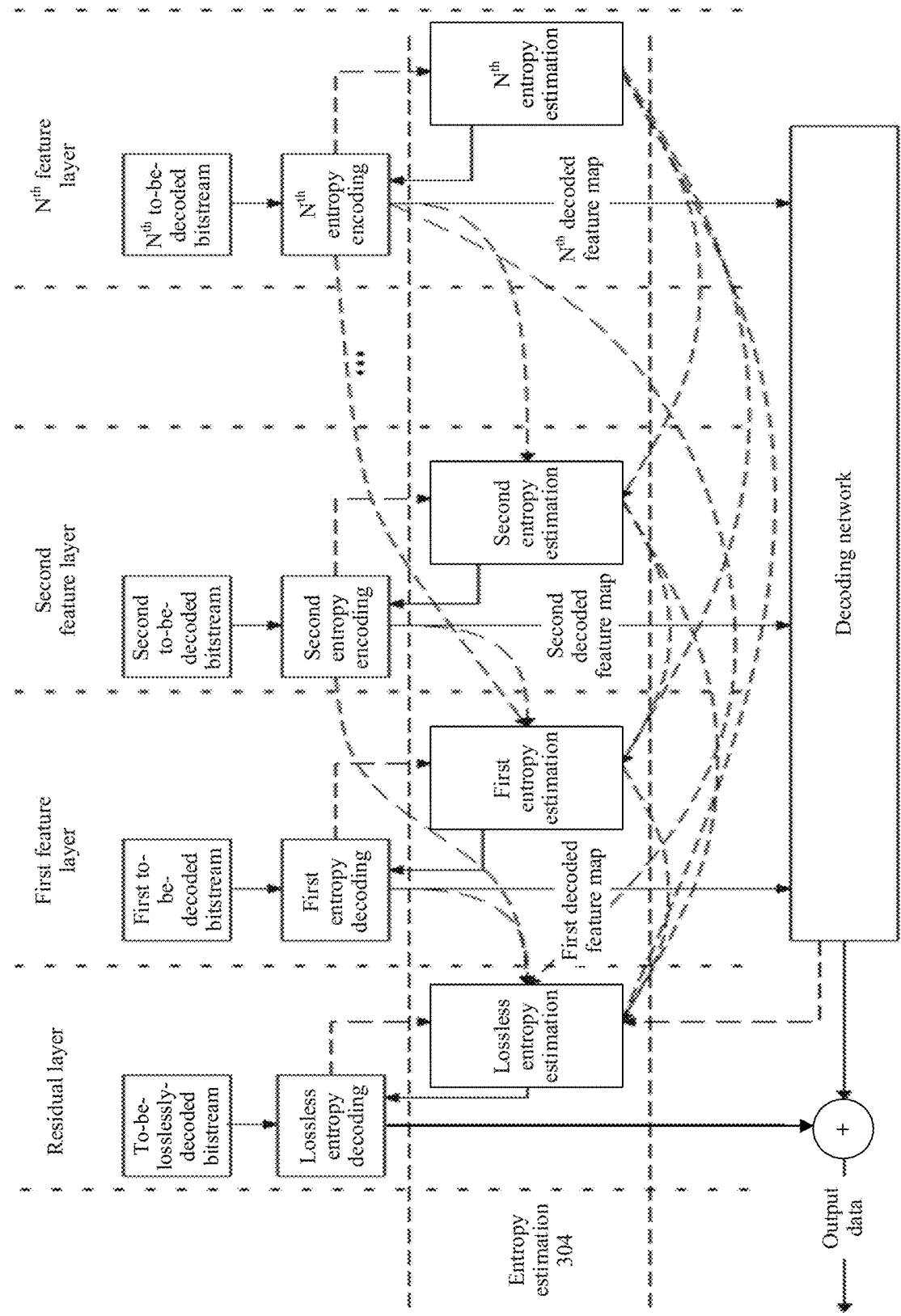

As shown in FIG. 10B, the entropy estimation unit 304 is configured to perform probability estimation on a decoded feature map to estimate a compression bit rate of a model. Input indicated by dashed lines is optional input. The entropy estimation unit 304 corresponds to N entropy estimation modules corresponding to N feature layers, and a lossless entropy estimation module corresponding to a residual layer.

In a possibility, as shown in FIG. 7A, a $P^{th}$ entropy estimation result in the decoder is input of $L^{th}$ entropy estimation, where L and P are positive integers, and L<P.

In another possibility, a plurality of entropy estimation results in the decoder are input of $L^{th}$ entropy estimation, and a sequence number of a feature layer corresponding to each of a plurality of entropy estimation modules is greater than L, where L is a positive integer. As shown in FIGS. 7B, L, I, T, and K are all positive integers, L<I, L<T, and L<K.

In a possibility, a $P^{th}$ decoded feature map in the decoder is input of $L^{th}$ entropy estimation, where L and P are positive integers, and L≤P.

In another possibility, a plurality of decoded feature maps in the decoder are input of $L^{th}$ entropy estimation, and sequence numbers of feature layers corresponding to a plurality of entropy decoding modules are all greater than L, where L is a positive integer.

In a possibility, at least one decoded feature map and at least one entropy estimation result in the decoder are input of $L^{th}$ entropy estimation, where L is a positive integer. A sequence number of a feature layer corresponding to a decoded feature map used as input of the $L^{th}$ entropy estimation is greater than or equal to L, and a sequence number of a feature layer corresponding to an entropy estimation result used as input of the $L^{th}$ entropy estimation is greater than L.

In a possibility, as shown in FIG. 7F, a $P^{th}$ entropy estimation result in the decoder is input of lossless entropy estimation, where P is a positive integer.

In another possibility, a plurality of entropy estimation results in the decoder are input of lossless entropy estimation. For example, as shown in FIGS. 7G, I, T, and K are all positive integers.

In a possibility, a $P^{th}$ decoded feature map in the decoder is input of lossless entropy estimation, where P is a positive integer.

In another possibility, a plurality of decoded feature maps in the decoder are input of lossless entropy estimation.

In a possibility, at least one decoded feature map and at least one entropy estimation result in the decoder are input of lossless entropy estimation.

In one possibility, at least one decoded feature map and a reconstructed audio or picture in the decoder are input of lossless entropy estimation.

In a possibility, at least one entropy estimation result and a reconstructed audio or picture in the decoder are input of lossless entropy estimation. For example, as shown in FIGS. 7K, I and T are both positive integers.

In a possibility, at least one entropy estimation result, a reconstructed audio or picture, and at least one decoded feature map in the decoder are input of lossless entropy estimation.

In a possibility, entropy estimation is a convolutional network, and the convolutional network includes a convolutional layer and a nonlinear activation layer. It can be learned that an entropy estimation network in an example in FIG. 8 includes five network layers, and includes three convolutional layers and two nonlinear activation layers.

Entropy Decoding Unit 306

The entropy decoding unit 306 is configured to parse the bitstream 21 (or usually, the encoded picture data 21), and perform entropy decoding on the encoded audio or picture data 21 to obtain a decoded feature map 307, a decoded encoding parameter (not shown in FIG. 11), and/or the like. The entropy decoding unit 304 may be configured to apply a decoding algorithm or scheme corresponding to an encoding scheme of the entropy encoding unit 208 of the encoder 20.

In a possibility, as shown in FIG. 10A, the entropy decoding unit is applied to a to-be-decoded bitstream corresponding to at least two feature layers.

In a possibility, as shown in FIG. 10B, the entropy decoding unit is applied to a to-be-losslessly-decoded bitstream corresponding to a residual layer.

In a possibility, because a real character probability of a rounded feature map is not known in entropy encoding, statistics may be collected on the information or related information as required, the information may be added to the entropy encoding module, and the information may be transmitted to the decoder side.

In a possibility, the decoder 30 may be further configured to perform entropy decoding on the picture 21 or a picture block in the picture 21.

In a possibility, the decoder 30 may be further configured to perform entropy decoding on the audio 21 or an audio segment in the audio 21.

Decoding Network Unit

The decoding network 306 is configured to enable the decoded feature map 307 to pass through the decoding network 308 to obtain a reconstructed audio or picture 310 in a pixel domain.

Figure 11:
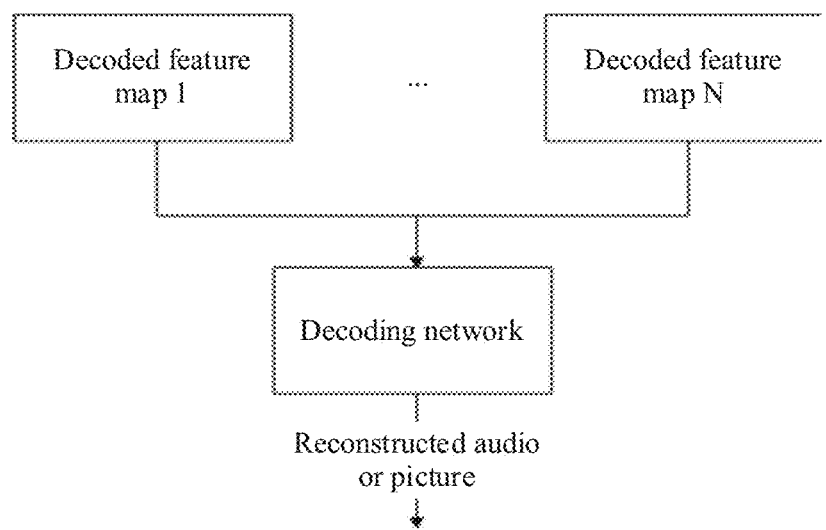
FIG. 11 is a schematic block diagram of a decoding network.

In a possibility, FIG. 11 is a schematic diagram of inputting N decoded feature maps to the decoding network, where N is greater than 1.

In a possibility, a decoded feature map is pre-processed before being input to the decoding network, including: subtracting a pixel value of a sample in an output feature map and a mean output by entropy estimation to obtain an offset feature map, adding up a pixel value of a sample in the decoded feature map and a mean output by entropy estimation to obtain an updated decoded feature map, and then inputting the updated decoded feature map to the decoding network.

Figure 12:
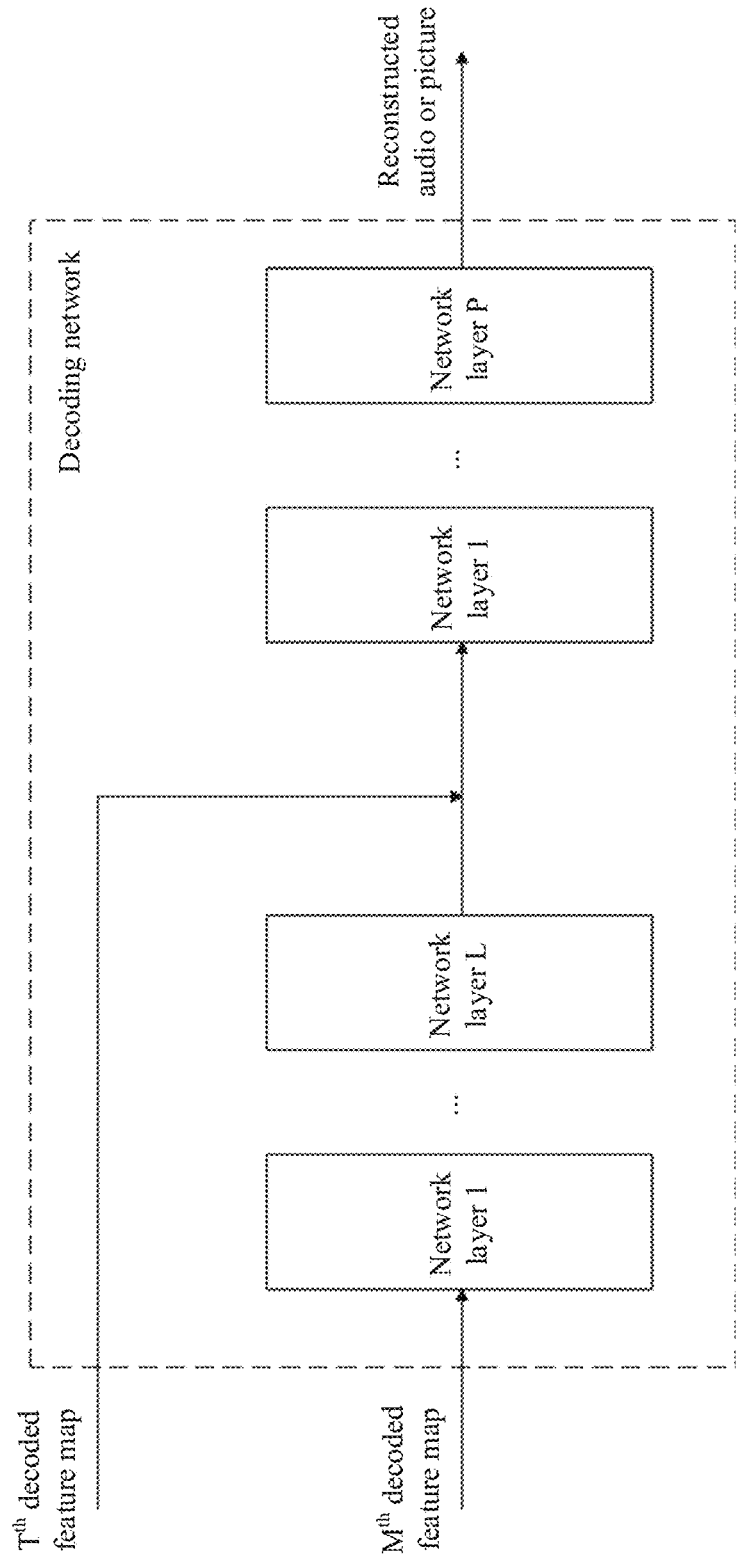
FIG. 12 is a schematic diagram of an input structure of a decoding network.

In a possibility, an input/output structure of the decoding network 306 is shown in FIG. 12. The decoding network 306 includes P network layers, where P>L, and M, L, T, and P are all positive integers. A $T^{th}$ decoded feature map is input after a network layer L in the decoding network 306. Both the $T^{th}$ decoded feature map and an $M^{th}$ decoded feature map are input of the decoding network. It can be understood that a plurality of decoded feature maps may be input after locations of different network layers in the decoding network unit. This is not limited herein.

Any network layer in FIG. 12 may be a convolutional layer, a normalization layer, a nonlinear activation layer, or the like.

In a possibility, the decoding network 306 may include operations such as concatenation (concat), addition, and subtraction.

In a possibility, structures of network layers in the decoding network 306 may be the same or different from each other.

Figure 13:
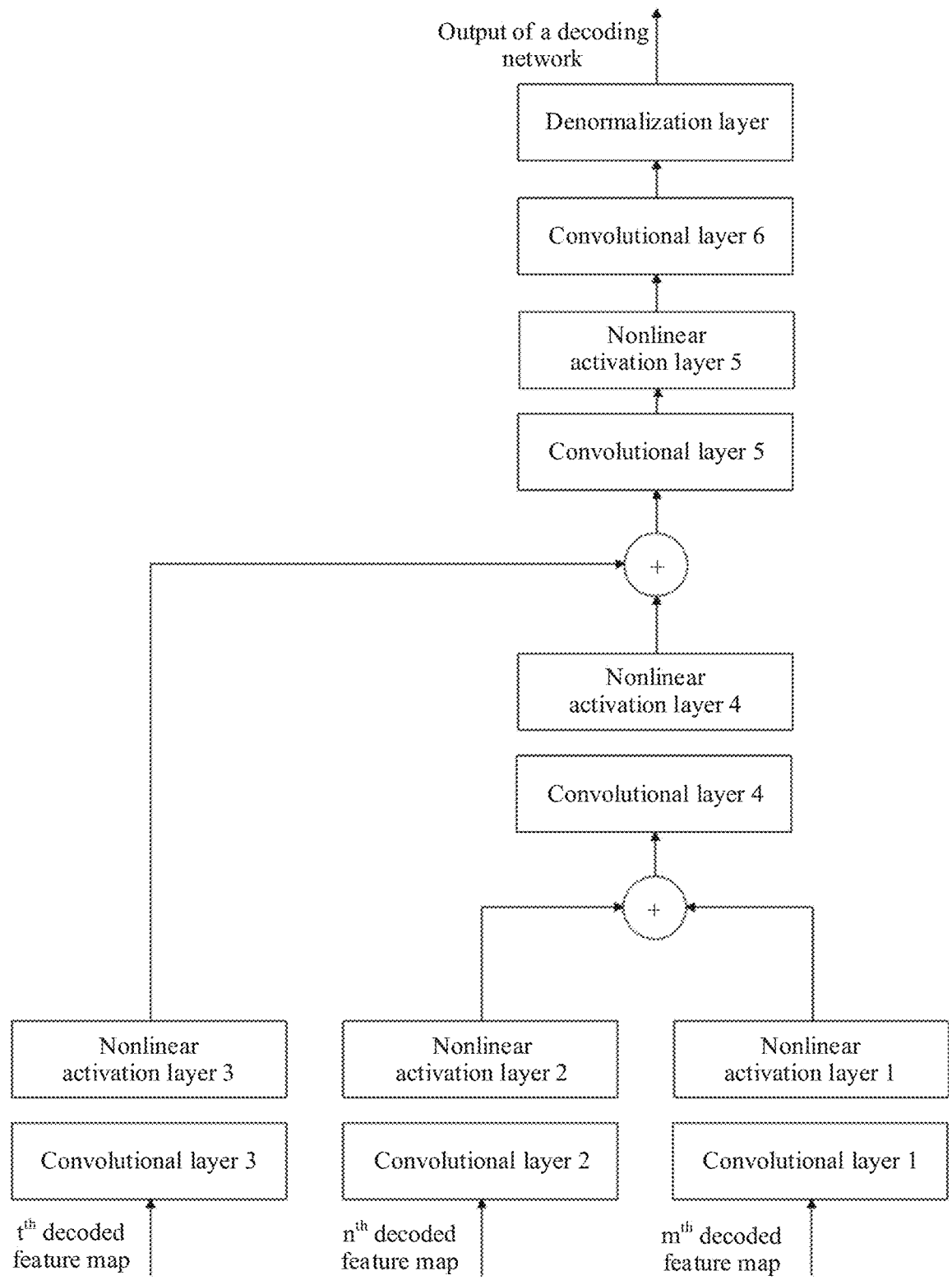
FIG. 13 is a diagram of an example structure of a decoding network according to an embodiment of this application.

In a possibility, an example of a structure of the decoding network 306 is shown in FIG. 13. It can be learned that the decoding network in the example includes 12 network layers, and includes one denormalization layer, six convolutional layers, and four nonlinear activation layers. m, n, and t are all positive integers. The decoding network outputs a decoded picture or a reconstructed audio or picture. A $t^{th}$ decoded feature map, an $n^{th}$ decoded feature map, and an $m^{th}$ decoded feature map are all input of the decoding network, where t, n, and m are integers.

It should be understood that, in the encoder 20 and the decoder 30, a processing result of a current operation may be further processed and then output to a next operation. For example, after processing is performed by the encoder unit or the decoder unit, an operation or processing, such as a clip or shift operation or filtering, may be further performed on a processing result of the encoder unit or the decoder unit.

Although the foregoing embodiments mainly describe audio/video coding, it should be noted that the embodiments of the decoding system 10, the encoder 20, and the decoder 30 and other embodiments described in this specification may also be used for processing or coding of static pictures, to be specific, processing or coding of a single picture independent of any previous or consecutive pictures in audio/video coding. All other functions (also referred to as tools or technologies) of the audio/video encoder 20 and the audio/video decoder 30 may also be used for processing of static pictures.

Figure 14A:
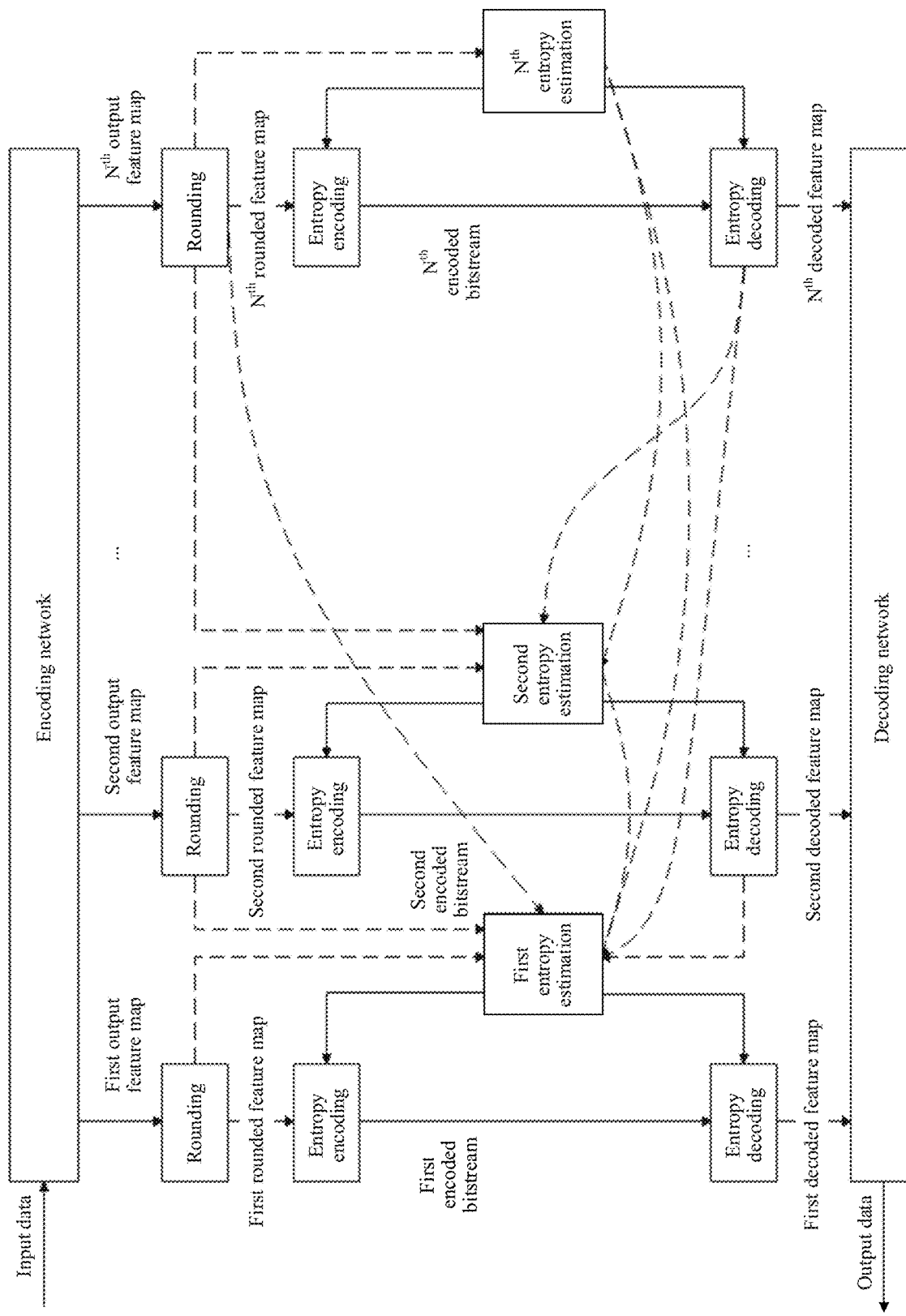
FIG. 14A to FIG. 14C show example structures according to an embodiment of this application.

FIG. 14A shows a possible system architecture according to this application. Model operation operations are as follows.

Encoder Side:

Operation 1: Input data passes through an encoding network, and N output feature maps are output.

Operation 2: Perform a rounding operation on the N output feature maps to obtain N rounded feature maps.

Operation 3: Sequentially (in an order from an $N^{th}$ to a $1^{st}$) estimate a probability of each rounded feature map based on entropy estimation, and perform entropy encoding on the N rounded feature maps to obtain N encoded bitstreams.

An $M^{th}$ rounded feature map may be input of $L^{th}$ entropy estimation, where L, M, and N are all positive integers, $L \geq 1$, and $L < M \leq N$.

$P^{th}$ entropy estimation may be input of $T^{th}$ entropy estimation, where T, P, and N are all positive integers, $T \geq 1$, and $T < P \leq N$.

Decoder Side:

Operation 1: Obtain N to-be-decoded bitstreams, and sequentially (in an order from an $N^{th}$ to a $1^{st}$) perform entropy decoding based on entropy estimation to obtain N decoded feature maps.

An $M^{th}$ rounded feature map may be input of $L^{th}$ entropy estimation, where L, M, and N are all positive integers, $L \geq 1$, and $L < M \leq N$.

$P^{th}$ entropy estimation may be input of $T^{th}$ entropy estimation, where T, P, and N are all positive integers, $T \geq 1$, and $T < P \leq N$.

Operation 2: N output feature maps pass through a decoding network to obtain output data.

Figure 14B:
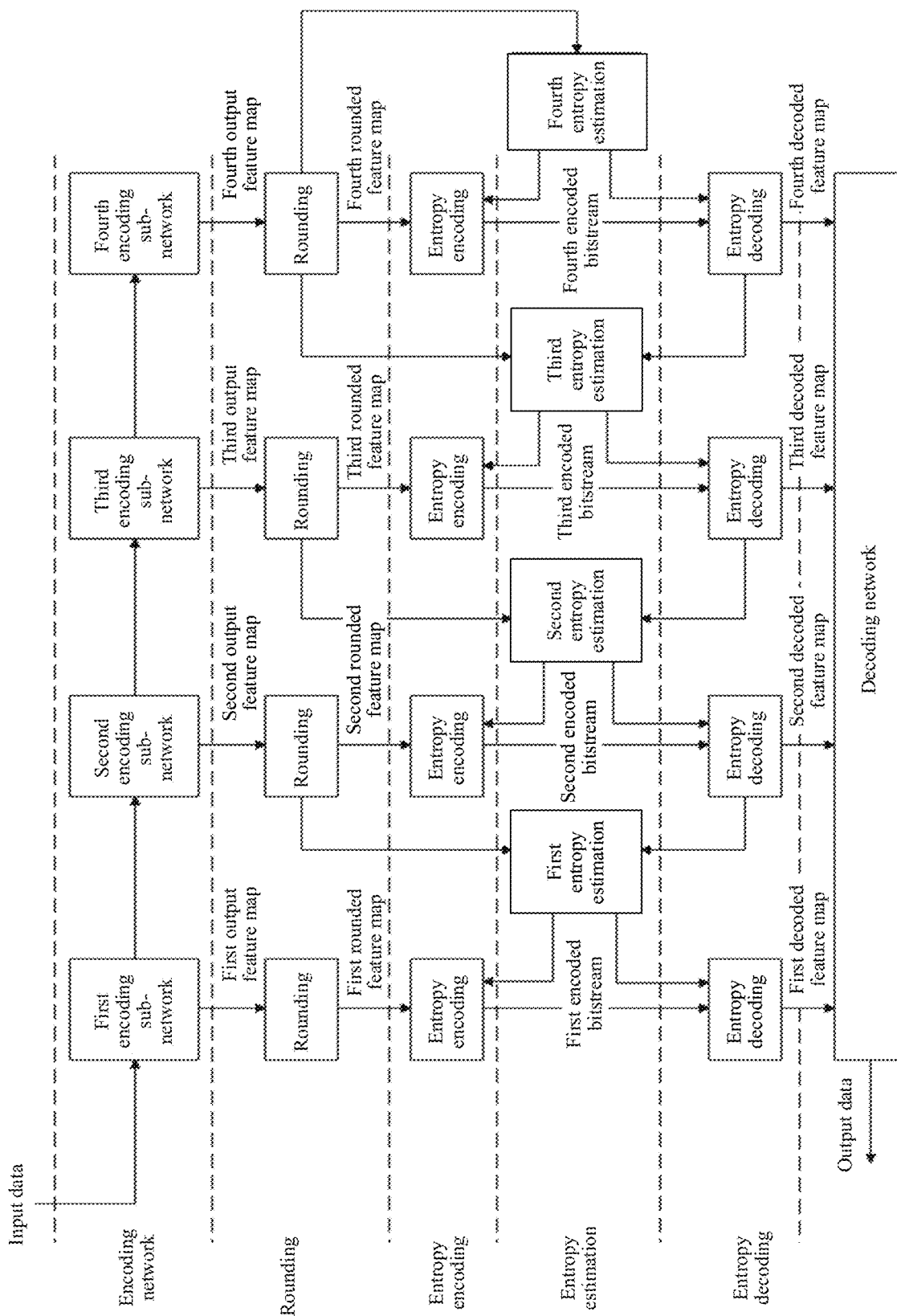
Figure 14C:
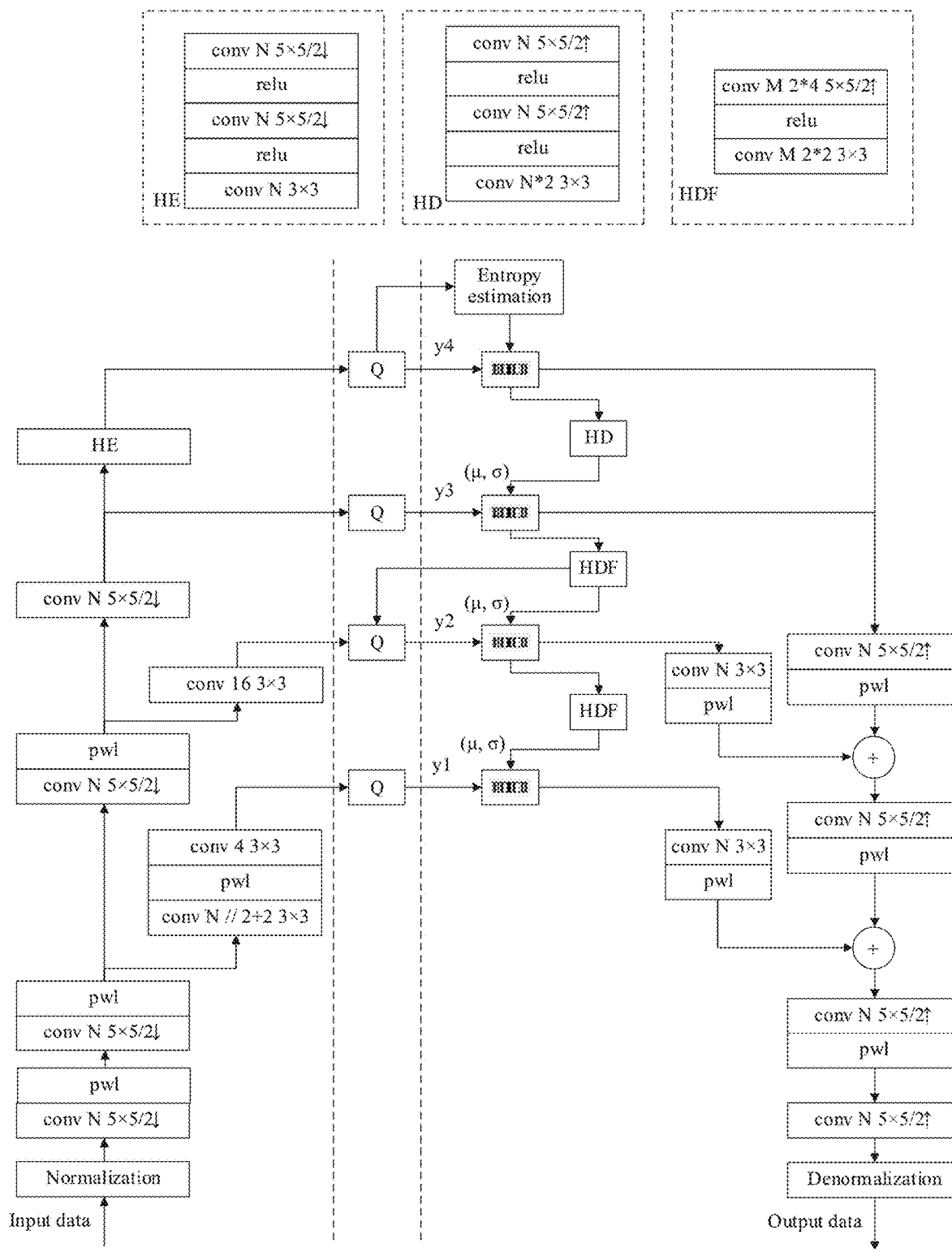

FIG. 14B and FIG. 14C show a system architecture 700 in a possible scenario according to an embodiment of this application. Model operation operations are as follows.

Encoder Side:

Operation 1: An encoding network module includes four feature layers, and extracts four output feature maps of an input picture through four encoding sub-networks, where a network depth, a quantity of feature layers, and a quantity of feature channels at each layer of each encoding network are variable, to achieve a function of dynamically changing a compression capability of a model.

Operation 2: As shown in FIG. 14B, a rounding module rounds a first to a fourth output feature maps to obtain a first to a fourth rounded feature maps, which correspond to $y_1$, $y_2$, $y_3$, and $y_4$ in FIG. 14C.

Operation 3: An entropy estimation module sequentially estimates probabilities of compressed features. As shown in FIG. 14B, the fourth rounded feature map is input of third entropy estimation, the third rounded feature map is input of second entropy estimation, and the second rounded feature map is input of first entropy estimation. Correspondingly, as shown in FIG. 14C, a probability of the rounded feature map $y_4$ is estimated by using a known probability, a probability of the rounded feature map $y_3$ is estimated by using the rounded feature map $y_4$, a probability of $y_2$ is estimated by using the rounded feature map $y_3$, and a probability of the rounded feature map $y_1$ is estimated by using the rounded feature map $y_2$.

Operation 4: As shown in FIG. 14B, in an order from a deep layer to a shallow layer, an entropy encoding module performs entropy encoding on the fourth rounded feature map based on a fourth entropy estimation result, performs entropy encoding on the third rounded feature map based on a third entropy estimation result, performs entropy encoding on the second rounded feature map based on a second entropy estimation result, and performs entropy encoding on the first rounded feature map based on a first entropy estimation result. Correspondingly, as shown in FIG. 14C, entropy encoding is sequentially performed on the rounded feature maps $y_4$, $y_3$, $y_2$, and $y_1$ based on the probabilities of the rounded feature maps $y_4$, $y_3$, $y_2$, and $y_1$, to generate data to be transmitted through a network or stored as a local file.

Decoder Side:

Operation 1: As shown in FIG. 14B, an entropy estimation network module decodes a fourth encoded bitstream or a fourth to-be-decoded bitstream based on a fourth entropy estimation result to obtain a fourth decoded feature map. Correspondingly, as shown in FIG. 14B, a probability of $y_4$ is estimated based on a known probability, and an entropy decoding module obtains $y_4$ through decoding.

Operation 2: As shown in FIG. 14C, a third entropy estimation network decodes a third encoded bitstream or a third to-be-decoded bitstream based on the fourth decoded feature map to obtain a third decoded feature map. Correspondingly, as shown in FIG. 14B, a probability of $y_3$ is estimated by using $y_4$, and the entropy decoding module obtains $y_3$ through decoding.

Operation 3: As shown in FIG. 14B, a second entropy estimation network decodes a second encoded bitstream or a second to-be-decoded bitstream based on the third decoded feature map to obtain a second decoded feature map. Correspondingly, as shown in FIG. 14B, a probability of $y_2$ is estimated by using $y_3$, and the entropy decoding module obtains $y_2$ through decoding.

Operation 4: As shown in FIG. 14C, a first entropy estimation network decodes a first encoded bitstream or a first to-be-decoded bitstream based on the second decoded feature map to obtain a first decoded feature map. Correspondingly, as shown in FIG. 14B, a probability of $y_1$ is estimated by using $y_2$, and the entropy decoding module obtains $y_1$ through decoding.

Operation 5: A decoding network module obtains a reconstructed audio or picture based on the decoded feature maps $y_4$, $y_3$, $y_2$, and $y_1$.

In this embodiment, N=128. Features at different layers are compressed at different bpp. Details are as follows:

when bpp$\leq$0.5, $y_4$ and $y_3$ are compressed;

when 0.5<bpp$\leq$1, $y_4$, $y_3$, and $y_2$ are compressed; or when bpp>1, $y_4$, $y_3$, $y_2$, and $y_1$ are compressed.

Figure 15:
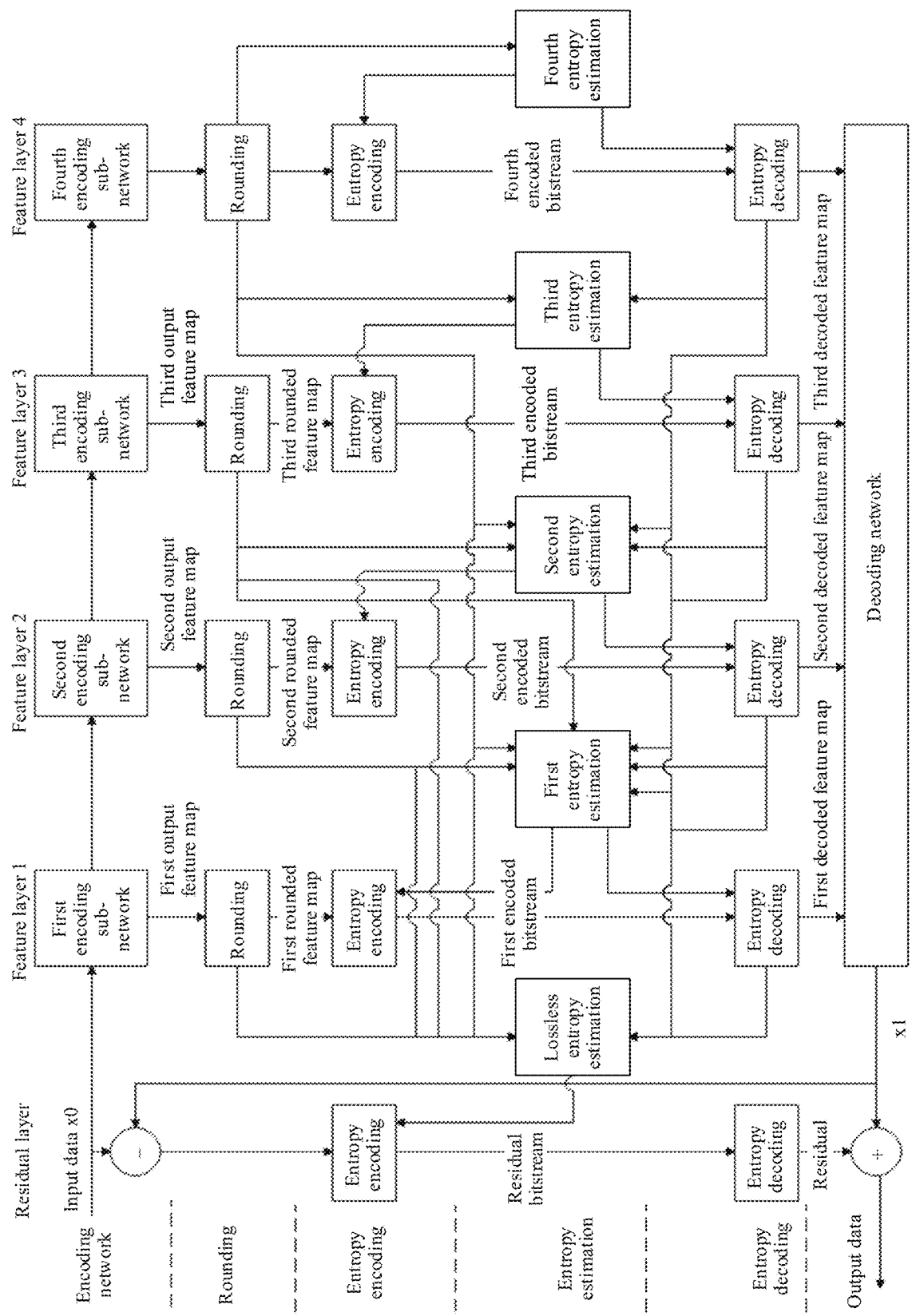
FIG. 15 shows an example system architecture (lossless) according to an embodiment of this application.

FIG. 15 shows a system architecture 800 in another possible scenario according to an embodiment of this application. This embodiment provides a lossless compression framework.

Model operation operations are as follows.

Encoder Side:

Operation 1: An encoding network module extracts an output feature map of each feature layer of input data x0 based on each feature layer.

Operation 2: A rounding module rounds an output feature map of each feature layer of a picture to obtain a rounded feature map.

Operation 3: A decoding network obtains a reconstructed audio or picture x1 based on a decoded feature map of each feature layer.

Operation 4: An encoding network obtains a residual x0-x1 of input data.

Operation 5: An entropy estimation network module sequentially performs entropy estimation from an underlying layer to a shallow layer (from a feature layer 4 to a feature layer 1 and finally to a residual layer) to obtain a probability estimation result of each layer.

Operation 6: An entropy encoding module sequentially (from an underlying layer to a shallow layer) performs entropy encoding, and a bitstream generated at each layer is transmitted through a network or stored as a local file.

Decoder Side:

Operation 1: An entropy estimation network and an entropy decoding module sequentially obtain, through decoding, a decoded feature map and a residual of each layer from bottom to top (from a feature layer 4 to a feature layer 1 and finally to a residual layer).

Operation 2: A decoding network module obtains a reconstructed audio or picture x1 based on each decoded feature map.

Operation 3: Concatenate the residual and the reconstructed audio or picture x1 to obtain output data or a lossless reconstructed audio or picture.

Figure 16:
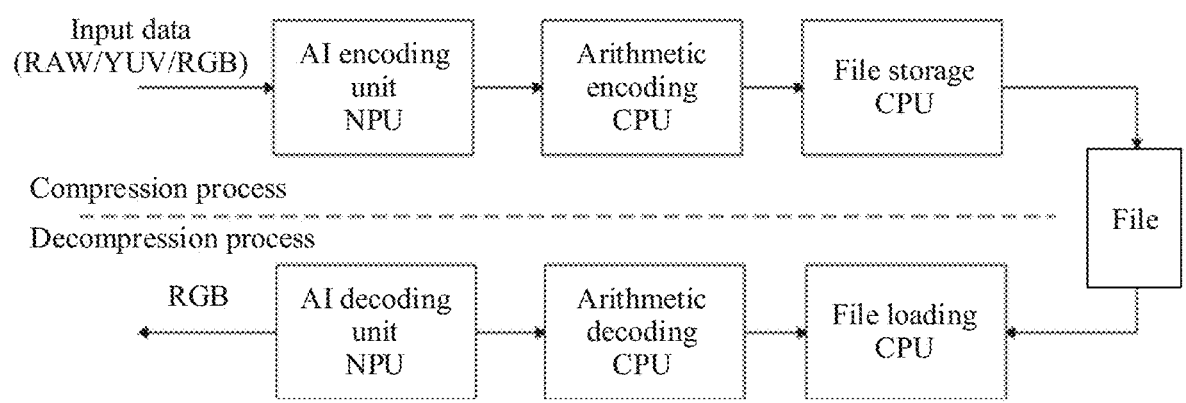
FIG. 16 shows an example system architecture according to an embodiment of this application.

In another embodiment, FIG. 16 shows a system architecture 900 in a possible scenario. Compression and decoding operations are as follows:

Operation 1: An AI encoding unit module is configured to transform picture data into an output feature with lower redundancy, and estimate a probability of each point in the output feature, where the AI encoding unit module includes an encoding network unit, a rounding unit, and an entropy estimation unit.

After a picture is captured by a picture capture device such as a camera, the picture may be used as input of the AI encoding unit in a plurality of picture representation forms, for example, a RAW-domain, YUV, or RGB representation form. A data processing process in the AI encoding unit module may be implemented on, for example, a neural network processing unit (NPU) or graphics processing unit (GPU) device.

Operation 2: An entropy encoding/decoding module (arithmetic encoding is used as an example) is configured to reduce encoding redundancy of the output feature, and further reduce an amount of data transmitted during picture compression.

A data processing process in the entropy encoding/decoding module may be implemented on a central processing unit (CPU).

Operation 3: An AI decoding unit module is configured to perform inverse transformation on the output feature, and parse the output feature into a picture. The AI decoding unit module includes a decoding network unit and an entropy estimation unit.

A data processing process in the AI encoding unit module may be implemented on, for example, a neural network processing unit (NPU) or graphics processing unit (GPU) device.

Operation 4: A file storage module is configured to store a data file generated by the entropy encoding module in a corresponding storage location on a terminal.

Operation 5: A file loading module is configured to load the data file from the corresponding storage location on the terminal, and input the data file to the entropy decoding module.

Figure 17:
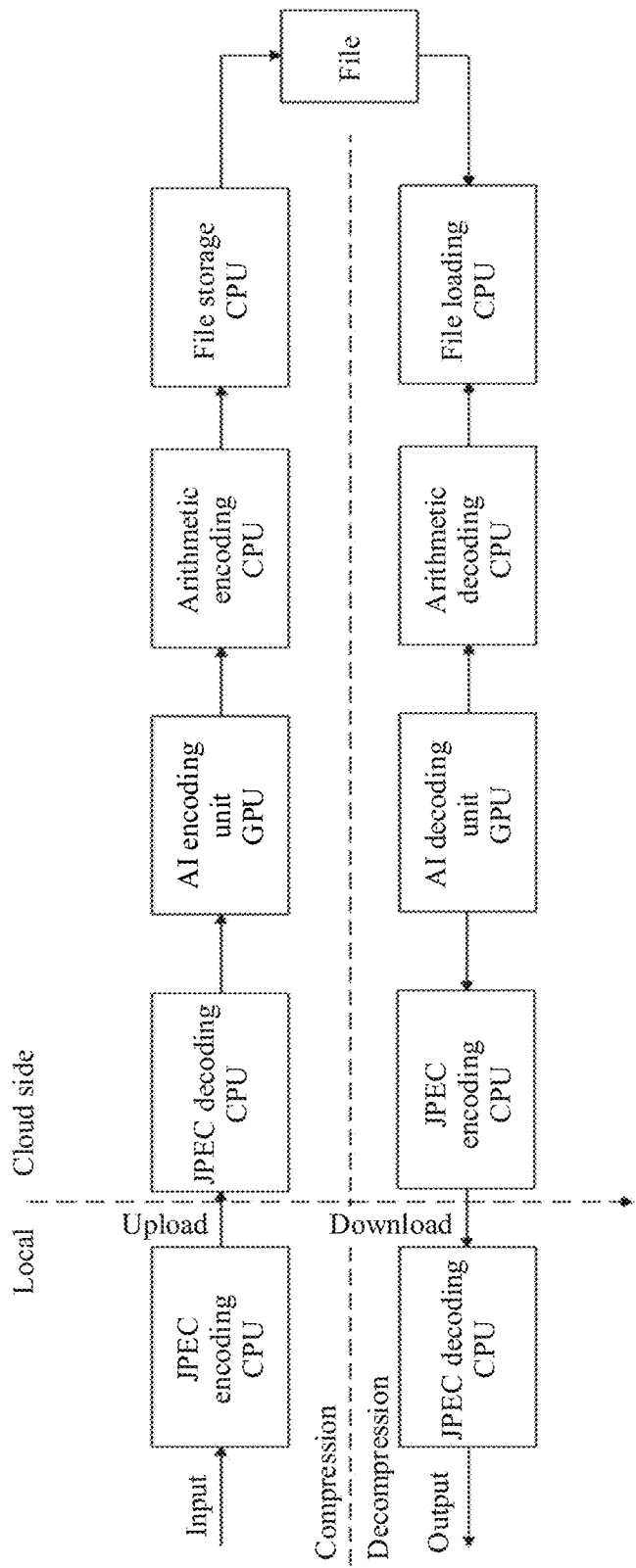
FIG. 17 shows an example system architecture (a cloud application) according to an embodiment of this application.

In another embodiment, FIG. 17 shows a system architecture 1000 in a possible scenario. This embodiment provides a diagram of a structure a cloud application device, including:

Operation 1: A JPEG encoding/decoding module on a local side or a cloud end is configured to compress/decompress a digital picture on the local side or the cloud side, to reduce an amount of data transmitted between the local side and the cloud side.

Operation 2: An AI encoding unit module is configured to transform a picture into an output feature with lower redundancy, and estimate a probability of each point in the output feature. The AI decoding unit module includes a decoding network unit and an entropy estimation unit.

Operation 3: An entropy encoding/decoding module (arithmetic encoding is used as an example) is configured to reduce encoding redundancy of the output feature, and further reduce an amount of data transmitted during picture compression.

Operation 4: An AI decoding unit module is configured to perform inverse transformation on the output feature, and parse the output feature into a picture. The AI decoding unit module includes a decoding network unit and an entropy estimation unit.

Operation 5: A file storage module is configured to store a data file, such as an encoded bitstream or a to-be-decoded bitstream, generated by the entropy encoding (arithmetic encoding is used as an example) module in a corresponding storage location on the cloud side.

Operation 6: A file loading module is configured to load the data file from the corresponding storage location on the cloud side, and input the data file to the entropy decoding unit.

Figure 18A:
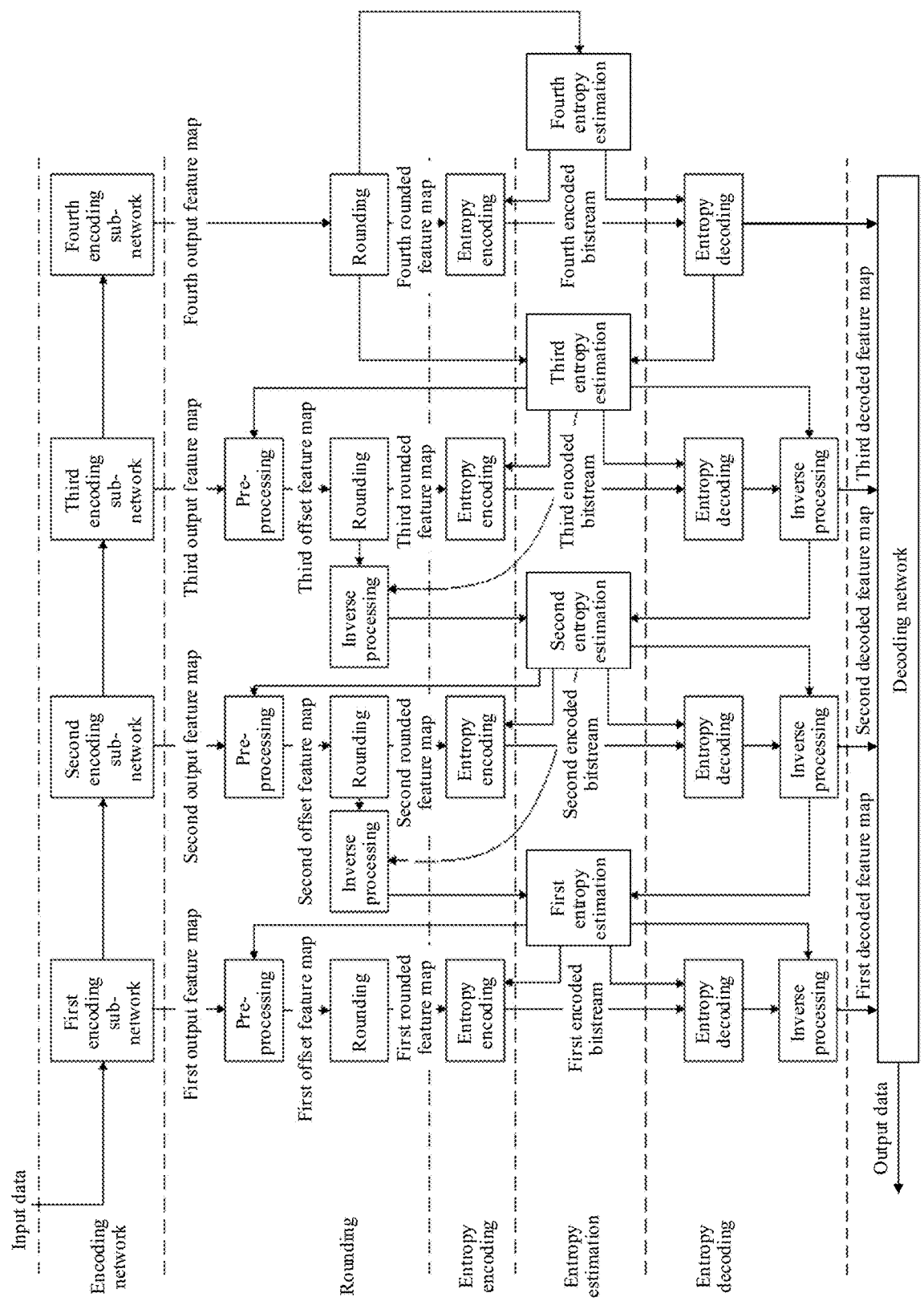
FIG. 18A and FIG. 18B show an example system architecture according to an embodiment of this application.
Figure 18B:
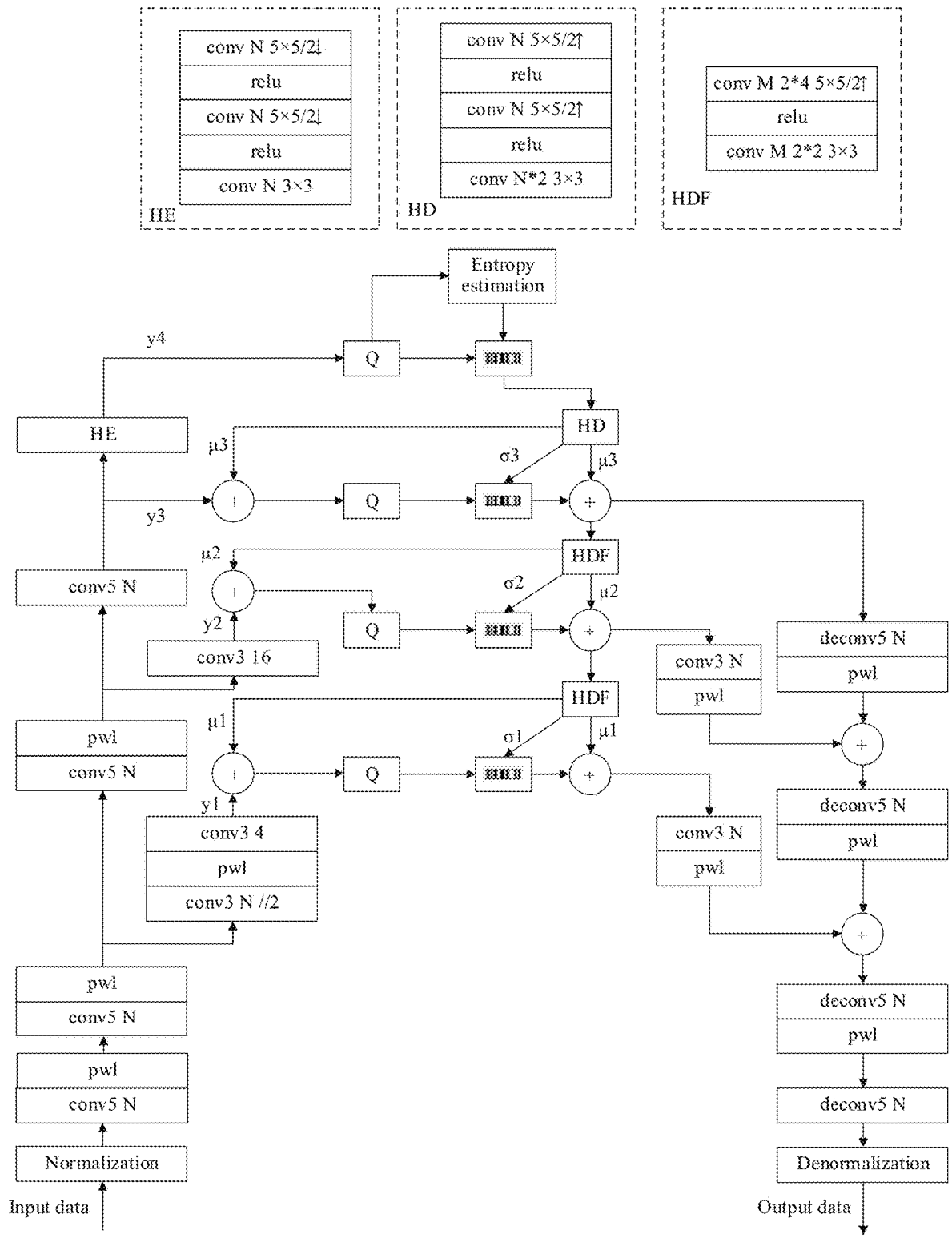

FIG. 18A and FIG. 18B show an embodiment of this application. Model operation operations are as follows.

Encoder Side:

Operation 1: An encoding network module includes four feature layers, and extracts four output feature maps of input data through four encoding sub-networks. The four output feature maps correspond to $y_1$, $y_2$, $y_3$, and $y_4$ in FIG. 18B. A network depth, a quantity of feature layers, and a quantity of feature channels at each layer of each encoding network are variable, to achieve a function of dynamically changing a compression capability of a model.

Operation 2: As shown in FIG. 18A, a first to a third output feature maps are pre-processed to obtain a first to a third offset feature maps. The pre-processing operation corresponds to a subtraction operation in FIG. 17B: A sample value of each pixel in an output feature map and a mean p output by entropy estimation are subtracted to obtain an offset feature map.

Operation 3: As shown in FIG. 18A, a rounding module rounds the first to the third offset feature maps and a fourth output feature map to obtain a first to a fourth rounded feature maps.

Operation 4: An entropy estimation module sequentially estimates probabilities of compressed features. As shown in FIG. 18A and FIG. 18B, a probability of the fourth rounded feature map is estimated by using a known probability, a probability of the third rounded feature map is estimated by using the fourth rounded feature map, a probability of the second rounded feature map is estimated by using an inverse-processed third rounded feature map as input of second entropy estimation, and a probability of the first rounded feature map is estimated by using an inverse-processed second rounded feature map as input of first entropy estimation.

Operation 5: As shown in FIG. 18A, in an order from a deep layer to a shallow layer, an entropy encoding module performs entropy encoding on the fourth rounded feature map based on a fourth entropy estimation result, performs entropy encoding on the third rounded feature map based on a third entropy estimation result such as variance information σ3, performs entropy encoding on the second rounded feature map based on a second entropy estimation result such as variance information σ2, and performs entropy encoding on the first rounded feature map based on a first entropy estimation result such as variance information σ1. Correspondingly, as shown in FIG. 18B, entropy encoding is sequentially performed on the fourth to the first rounded feature maps based on the probabilities of the rounded feature maps, to generate data to be transmitted through a network or stored as a local file.

The inverse processing operation on the encoder side is to add up a sample value of each pixel in a rounded feature map and a mean output by entropy estimation.

Decoder Side:

Operation 1: As shown in FIG. 18A, an entropy estimation network module performs entropy decoding on a fourth encoded bitstream or a fourth to-be-decoded bitstream based on a fourth entropy estimation result to obtain a fourth decoded feature map.

Operation 2: As shown in FIG. 18A, a third entropy estimation network obtains an output probability estimation result such as variance information σ3 based on the fourth decoded feature map, performs entropy decoding on a third encoded bitstream or a third to-be-decoded bitstream based on a third entropy estimation output result to obtain a third decoded feature map, performs inverse processing on the third decoded feature map to obtain an updated third decoded feature map, and uses the updated third decoded feature map as input of second entropy estimation to estimate a probability of a second decoded feature map.

Operation 3: As shown in FIG. 18A, entropy decoding is performed on a second encoded bitstream or a second to-be-decoded bitstream based on a probability estimation result such as variance information σ2 output by the second entropy estimation, to obtain the second decoded feature map, inverse processing is performed on the second decoded feature map to obtain an updated second decoded feature map, and the updated second decoded feature map is used as input of first entropy estimation to estimate a probability of a first decoded feature map.

Operation 4: As shown in FIG. 18A, entropy decoding is performed on a first encoded bitstream or a first to-be-decoded bitstream based on a probability estimation result such as variance information σ1 output by the first entropy estimation, to obtain the first decoded feature map, and inverse processing is performed on the first decoded feature map to obtain an updated first decoded feature map.

Operation 5: A decoding network module obtains a reconstructed audio or picture based on the updated first, second, and third decoded feature maps.

The inverse processing operation on the decoder side is to add up a sample value of each pixel in a decoded feature map and a mean output by entropy estimation.

Figure 19:
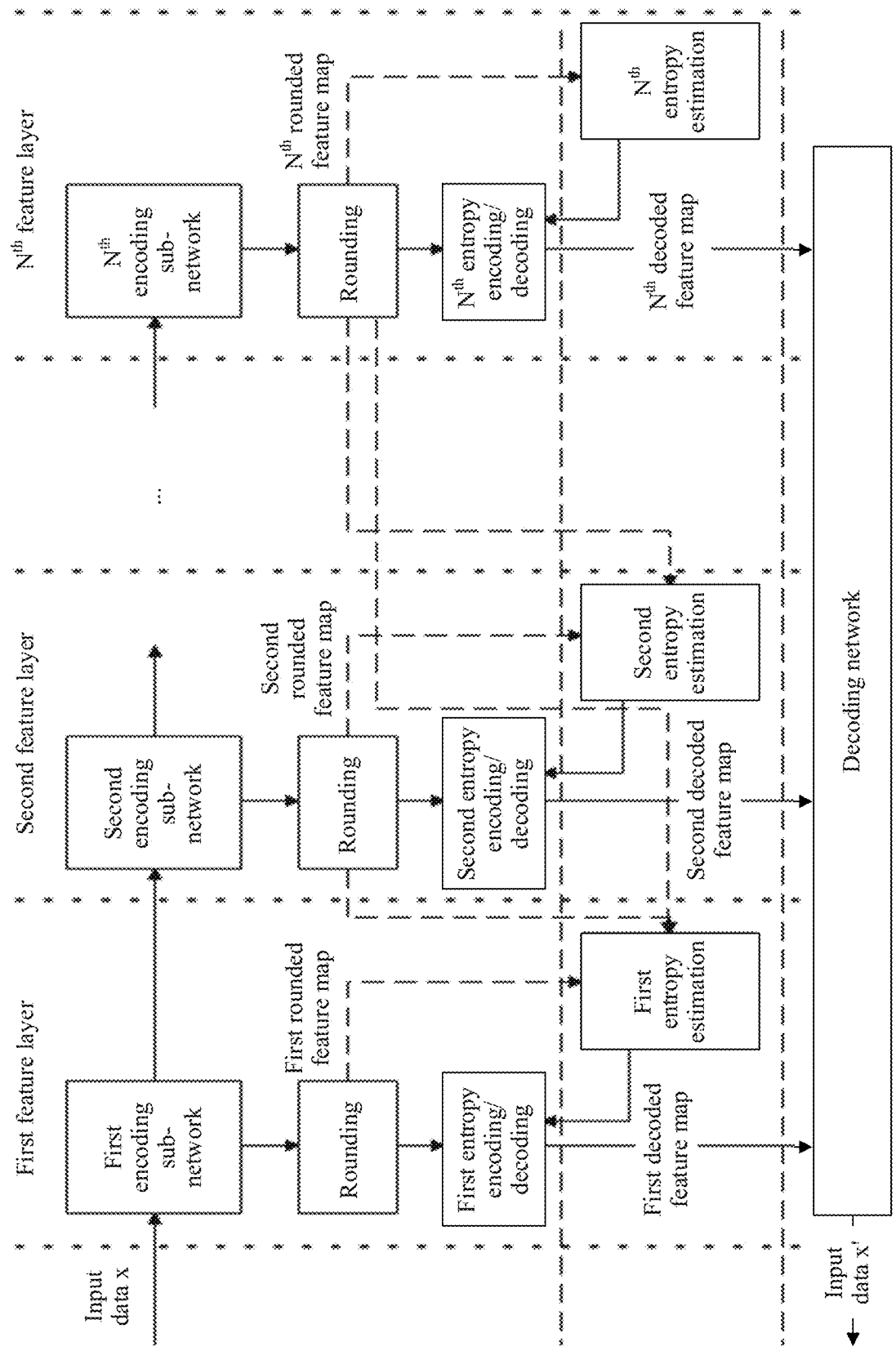
FIG. 19 shows an example system architecture (audio) according to an embodiment of this application.

FIG. 19 shows an embodiment of this application. This embodiment provides an audio compression framework. Model operations are as follows.

Encoder Side:

Operation 1: An encoding network module is divided into N feature layers, and an output feature of each layer of an audio x is extracted based on each layer.

Operation 2: A rounding module rounds the output feature of each layer of the audio x to obtain a rounded feature of each layer.

Operation 3: An entropy estimation network module sequentially estimates a probability of the rounded feature of each layer in an order from an underlying layer (an $n^{th}$ feature layer) to a shallow layer (a $1^{st}$ layer).

Operation 4: An entropy encoding module sequentially performs entropy encoding in an order from an underlying layer (the $n^{th}$ feature layer) to a shallow layer (the $1^{st}$ layer) based on an entropy estimation result, where an encoded bitstream of each layer is transmitted through a network or stored as a local file.

Decoder Side:

Operation 1: An entropy estimation network and an entropy decoding module sequentially obtain, through decoding, a decoded feature of each layer in an order from an underlying layer (the $n^{th}$ feature layer) to a shallow layer (the $1^{st}$ layer).

Operation 2: A decoding network module reconstructs an audio x' based on the decoded feature of each layer.

A person skilled in the art can understand that the functions described with reference to various illustrative logical blocks, modules, and algorithm operations disclosed and described in this specification may be implemented by hardware, software, firmware, or any combination thereof. If implemented by software, the functions described with reference to the illustrative logical blocks, modules, and operations may be stored in or transmitted through a computer-readable medium as one or more instructions or code and executed by a hardware-based processing unit. The computer-readable medium may include a computer-readable storage medium, which corresponds to a tangible medium such as a data storage medium, or may include any communication medium that facilitates transmission of a computer program from one place to another place (for example, according to a communication protocol). In this manner, the computer-readable medium may generally correspond to: (1) a non-transitory tangible computer-readable storage medium, or (2) a communication medium such as a signal or a carrier. The data storage medium may be any usable medium that can be accessed by one or more computers or one or more processors to retrieve instructions, code, and/or data structures for implementing technologies described in this application. A computer program product may include a computer-readable medium.

As an example rather than a limitation, the computer-readable storage medium may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of instructions or data structures and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but are actually non-transitory tangible storage media. Disks and discs used in this specification include a compact disc (CD), a laser disc, an optical disc, a digital versatile disc (DVD), and a Blu-ray disc. The disks usually reproduce data magnetically, and the discs reproduce data optically through lasers. Combinations of the foregoing items should also be included in the scope of the computer-readable medium.

An instruction may be executed by one or more processors such as one or more digital signal processors (DSP), general-purpose microprocessors, application-specific integrated circuits (ASIC), field programmable gate arrays (FPGA), or other equivalent integrated or discrete logic circuits. Therefore, the term "processor" used in this specification may refer to the foregoing structure or any other structure suitable for implementing technologies described in this specification. In addition, in some embodiments, the functions described with reference to the illustrative logical blocks, modules, and operations described in this specification may be provided in dedicated hardware and/or software modules configured for encoding and decoding, or may be integrated into a combined codec. In addition, the technologies may be completely implemented in one or more circuits or logic elements.

Technologies of this application may be implemented in various apparatuses or devices, including a wireless handset, an integrated circuit (IC), or a set of ICs (for example, a chip set). Various components, modules, or units are described in this application to emphasize functional embodiments of apparatuses configured to perform disclosed technologies, but do not necessarily need to be implemented by different hardware units. Actually, as described above, various units may be combined into a codec hardware unit in combination with appropriate software and/or firmware, or may be provided by interoperable hardware units (including the one or more processors described above).

The foregoing descriptions are merely example embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An audio/video or picture encoding method, comprising:
    enabling an audio or a picture to pass through an encoding network to obtain a first output feature map of the audio or picture;
    enabling the audio or picture to pass through the encoding network to obtain a second output feature map of the audio or picture;
    rounding the first output feature map to obtain a first rounded feature map of the audio or picture;
    rounding the second output feature map to obtain a second rounded feature map of the audio or picture;
    performing entropy encoding on the second rounded feature map based on a probability estimation result of second entropy estimation to obtain a second encoded bitstream;
    performing probability estimation of first entropy estimation based on the second rounded feature map and/or the probability estimation result of the second entropy estimation to obtain a probability estimation result of the first entropy estimation; and
    performing entropy encoding on the first rounded feature map based on the probability estimation result of the first entropy estimation to obtain a first encoded bitstream.

2. The method according to claim 1, wherein the method further comprises:
    enabling the audio or picture to pass through the encoding network to obtain a third output feature map of the audio or picture, and rounding the third output feature map to obtain a third rounded feature map of the audio or picture; and
    performing entropy encoding on the third rounded feature map based on a probability estimation result of third entropy estimation to obtain a third encoded bitstream.

3. The method according to claim 2, wherein the method further comprises:
    performing probability estimation of the second entropy estimation based on the third entropy estimation result and/or the third rounded feature map of the audio or picture to obtain the probability estimation result of the second entropy estimation.

4. The method according to claim 1, wherein the method further comprises:
    enabling the audio or picture to pass through the encoding network to obtain a $k^{th}$ output feature map of the audio or picture, and rounding the $k^{th}$ output feature map to obtain a $k^{th}$ rounded feature map of the audio or picture, wherein k is an integer greater than 3.

5. The method according to claim 4, wherein the $k^{th}$ rounded feature map is input information of $n^{th}$ entropy estimation, n is an integer, and n≤k.

6. The method according to claim 1, wherein the method further comprises:
    outputting a reconstructed audio or picture of the audio or picture by using at least one of the rounded feature maps as input of a decoding network of the audio or picture;
    calculating a difference between corresponding samples of the audio or picture and the reconstructed audio or picture to obtain a residual picture of the audio or picture;
    obtaining probability estimation of lossless entropy estimation of a to-be-decoded audio or picture based on at least one of the following information:
        any one or more of the entropy estimation results;
        any one or more of the rounded feature maps; or
        the reconstructed audio or picture; and
    performing entropy encoding on the residual picture based on the probability estimation result of the lossless entropy estimation to obtain a lossless encoded bitstream of the audio or picture.

7. The method according to claim 1, wherein the method further comprises:
    prior to the rounding of the first output feature map, subtracting a pixel value of a sample in the first output feature map and a mean output by the first entropy estimation to obtain a first offset feature map; and
    rounding the first offset feature map to obtain the first rounded feature map of the audio or picture.

8. The method according to claim 2, wherein the method further comprises:
    before rounding an $m^{th}$ output feature map to obtain an $m^{th}$ rounded feature map of the audio or picture, the method further comprises:
    subtracting a pixel value of a sample in the $m^{th}$ output feature map and a mean output by $m^{th}$ entropy estimation to obtain an $m^{th}$ offset feature map; and
    the rounding of the $m^{th}$ output feature map to obtain the $m^{th}$ rounded feature map of the audio or picture comprises:
        rounding the $m^{th}$ offset feature map to obtain the $m^{th}$ rounded feature map of the audio or picture; and
        adding up the pixel value of the sample in the $m^{th}$ rounded feature map and the mean output by the $m^{th}$ entropy estimation, and using a sum as input of $t^{th}$ entropy estimation, wherein m is an integer greater than 1, and t is an integer less than m.

9. A picture decoding method, comprising:
obtaining a first to-be-decoded bitstream of a to-be-decoded audio or picture;
obtaining a second to-be-decoded bitstream of the to-be-decoded audio or picture;
performing entropy decoding on the second decoded bitstream of the to-be-decoded audio or picture based on a probability estimation result of second entropy estimation of the to-be-decoded audio or picture to obtain a second decoded feature map of the to-be-decoded audio or picture;
performing probability estimation of first entropy estimation based on the second decoded feature map and/or the probability estimation result of the second entropy estimation to obtain a probability estimation result of the first entropy estimation;
performing entropy decoding on the first decoded bitstream based on the probability estimation result of the first entropy estimation to obtain a first decoded feature map of the to-be-decoded audio or picture; and
outputting a reconstructed audio or picture of the to-be-decoded audio or picture by using the first decoded feature map and/or the second decoded feature map as input of a decoding network.

10. The method according to claim 9, wherein the method further comprises:
obtaining a third to-be-decoded bitstream of the to-be-decoded audio or picture;
performing entropy decoding on the third to-be-decoded bitstream based on a probability estimation result of third entropy estimation of the to-be-decoded audio or picture to obtain a third decoded feature map of the to-be-decoded audio or picture;
performing probability estimation of the second entropy estimation of the to-be-decoded audio or picture based on the third decoded feature map and/or the probability estimation result of the third entropy estimation; and
outputting the reconstructed audio or picture of the to-be-decoded audio or picture by using at least one of the first decoded feature map, the second decoded feature map, and the third decoded feature map as input of the decoding network.

11. The method according to claim 10, wherein the probability estimation of the second entropy estimation is performed on the to-be-decoded audio or picture based on the third decoded feature map and/or the probability estimation result of the third entropy estimation.

12. The method according to claim 10, wherein the method further comprises:
obtaining an $m^{th}$ to-be-decoded bitstream of the to-be-decoded audio or picture; and
performing entropy decoding on the $m^{th}$ to-be-decoded bitstream based on a probability estimation result of $m^{th}$ entropy estimation of the to-be-decoded audio or picture to obtain an $m^{th}$ decoded feature map of the to-be-decoded audio or picture, wherein m is an integer greater than 3.

13. The method according to claim 12, wherein the $m^{th}$ decoded feature map and/or the probability estimation result of the $m^{th}$ entropy estimation is input information of $t^{th}$ entropy estimation, wherein t is an integer less than or equal to m.

14. The method according to claim 9, wherein the method further comprises:
obtaining a to-be-losslessly-decoded bitstream of the to-be-decoded audio or picture;
obtaining a probability estimation result of lossless entropy estimation of the to-be-decoded audio or picture based on at least one of the following information:
at least one of the decoded feature maps;
at least one of the probability estimation results of the entropy estimations; or
the reconstructed audio or picture of the to-be-decoded audio or picture;
performing entropy decoding on the to-be-losslessly-decoded bitstream based on the probability estimation result of the lossless entropy estimation of the to-be-decoded audio or picture to obtain a residual picture of the to-be-decoded audio or picture; and
performing summation on corresponding samples of the reconstructed audio or picture of the to-be-decoded audio or picture and the residual picture of the to-be-decoded audio or picture to obtain a lossless reconstructed audio or picture of the to-be-decoded audio or picture.

15. The method according to claim 9, wherein when the first decoded feature map is input of the decoding network, a pixel value of a sample in the first decoded feature map and a mean output by the first entropy estimation are added up to obtain the first decoded feature map.

16. An encoder, comprising a processing circuit, wherein the processing circuit is configured to:
enable an audio or a picture to pass through an encoding network to obtain a first output feature map of the audio or picture;
enable the audio or picture to pass through the encoding network to obtain a second output feature map of the audio or picture;
round the first output feature map to obtain a first rounded feature map of the audio or picture;
round the second output feature map to obtain a second rounded feature map of the audio or picture;
perform entropy encoding on the second rounded feature map based on a probability estimation result of second entropy estimation to obtain a second encoded bitstream;
perform probability estimation of first entropy estimation based on the second rounded feature map and/or the probability estimation result of the second entropy estimation to obtain a probability estimation result of the first entropy estimation; and
perform entropy encoding on the first rounded feature map based on the probability estimation result of the first entropy estimation to obtain a first encoded bitstream.

17. A decoder, comprising a processing circuit, configured to perform the method according to claim 9.

18. A computer program product, comprising program code, wherein when being executed on a computer or a processor, the program code is used for performing the method according to claim 1.

19. A non-transitory computer-readable storage medium, comprising program code, wherein when being executed by a computer device, the program code is used for performing the method according to claim 1.

* * * * *